(12) United States Patent
Lillejordet et al.

(10) Patent No.: US 11,085,276 B2
(45) Date of Patent: Aug. 10, 2021

(54) HORIZONTAL SUBSEA TIE-IN SYSTEM

(71) Applicant: Nautilus Subsea AS, Lysaker (NO)

(72) Inventors: Per Lillejordet, Bjørnemyr (NO);
Simon Nicholas Mills, Oslo (NO);
Erik Olsvik, Oslo (NO); Paul Fredrik Tveiten, Oslo (NO)

(73) Assignee: Nautilus Subsea AS, Lysaker (NO)

( * ) Notice: Subject to any disclaimer, the term of this patent is extended or adjusted under 35 U.S.C. 154(b) by 0 days.

(21) Appl. No.: 16/616,237

(22) PCT Filed: May 24, 2018

(86) PCT No.: PCT/NO2018/050137
§ 371 (c)(1),
(2) Date: Nov. 22, 2019

(87) PCT Pub. No.: WO2018/217099
PCT Pub. Date: Nov. 29, 2018

(65) Prior Publication Data
US 2020/0157923 A1 May 21, 2020

(30) Foreign Application Priority Data
May 24, 2017 (NO) .................................. 20170854

(51) Int. Cl.
*E21B 43/013* (2006.01)
*F16L 1/26* (2006.01)
*E21B 43/01* (2006.01)

(52) U.S. Cl.
CPC .............. *E21B 43/013* (2013.01); *F16L 1/26* (2013.01); *E21B 43/0107* (2013.01)

(58) Field of Classification Search
CPC combination set(s) only.
See application file for complete search history.

(56) References Cited

U.S. PATENT DOCUMENTS 7,503,727 B2   3/2009   Ingebretsen et al.
8,961,070 B1 *   2/2015   Mascarenhas ............ F16L 1/26
                                                                                              405/170
(Continued)

FOREIGN PATENT DOCUMENTS

EP              2722479 A1    4/2014
WO    WO-2008063080 A1    5/2008
(Continued)

OTHER PUBLICATIONS

Eriksson, Magnus, "International Search Report," prepared for PCT/NO2018/050137, dated Aug. 2, 2018, four pages.

*Primary Examiner* — Kyle Armstrong
(74) *Attorney, Agent, or Firm* — Shackelford, Bowen, McKinley & Norton, LLP

(57) ABSTRACT

A subsea horizontal tie-in system comprising a porch part (100) with a porch hub (101*a*), a termination part (200) with a termination hub (201*a*). The termination part is configured to land on the porch part. The tie-in system further has an alignment system to align the porch hub (101*a*) and the termination hub (201*a*) during movement of the termination hub towards the porch hub in a landed state. The alignment system comprises guide arrangements (A1, A2, B1, B2) having porch guide faces (113*p*, 113*q*, 113*r*) on the porch part and termination guide faces (213*p*, 213*q*, 213*r*) on the termination part. The porch guide faces and termination guide faces are configured to slide against each other during said movement. The porch part (100) comprises a base plate (103) on which the porch guide faces are arranged.

20 Claims, 33 Drawing Sheets

(56) References Cited

U.S. PATENT DOCUMENTS

2010/0021238 A1\* 1/2010 Mogedal .................. F16L 1/26
 405/169
2012/0160505 A1 6/2012 Lonnemo et al.
2012/0199358 A1 8/2012 Larsson

FOREIGN PATENT DOCUMENTS

| WO | WO-2009082240 A1 | 7/2009 |
| WO | WO-2011043671 A1 | 4/2011 |
| WO | WO-2015197539 A1 | 12/2015 |
| WO | WO-2016083257 A1 | 6/2016 |

\* cited by examiner

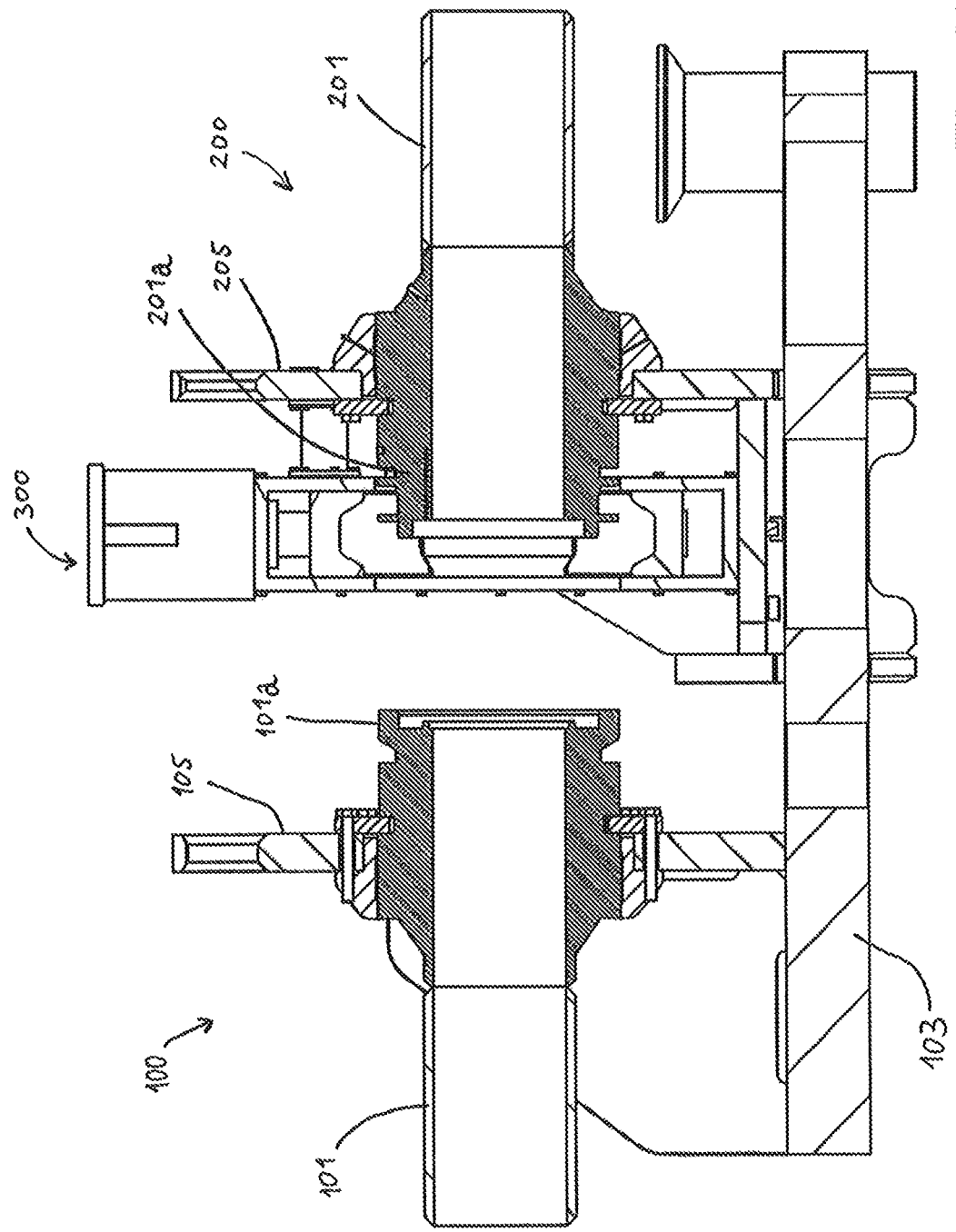

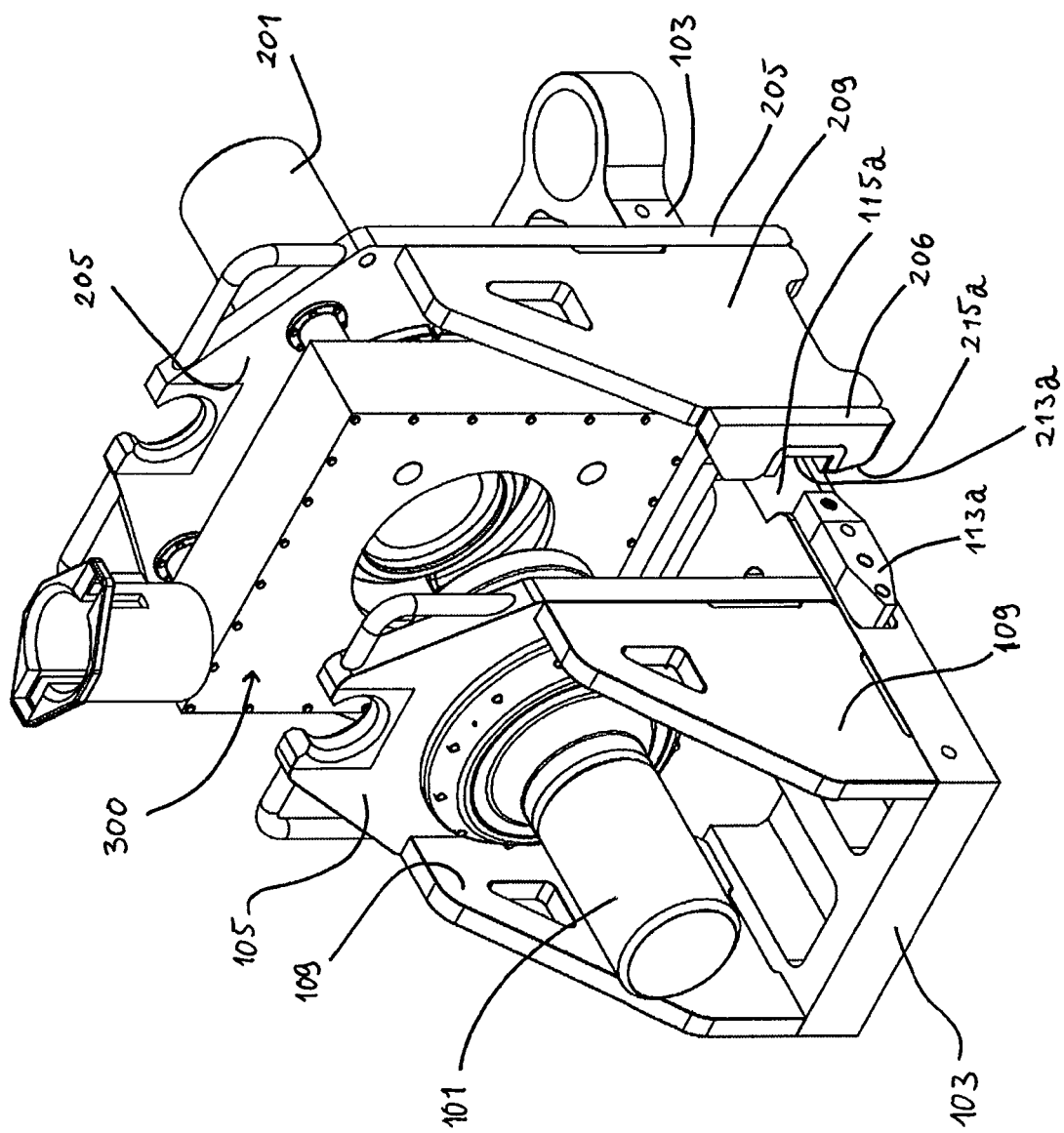

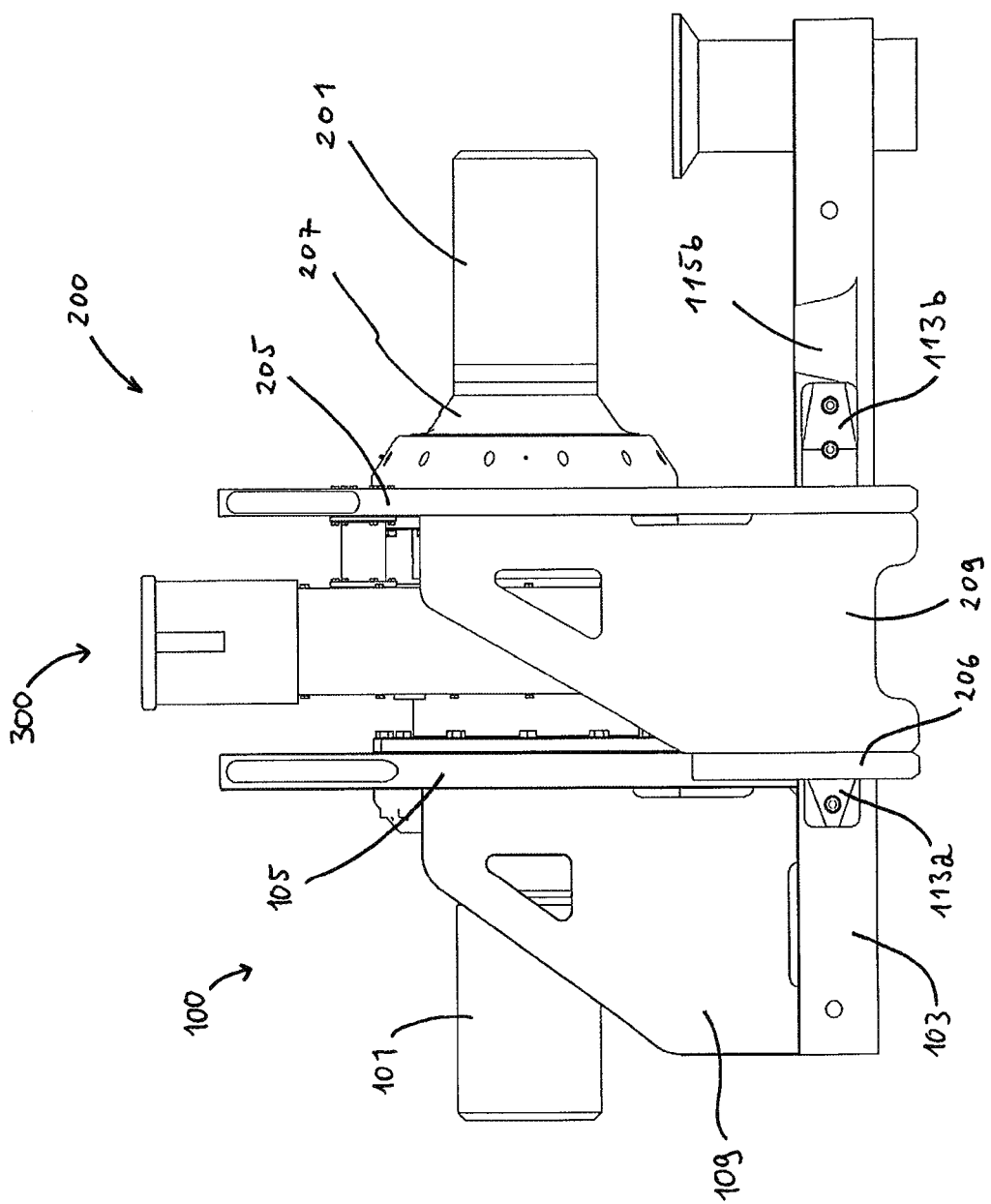

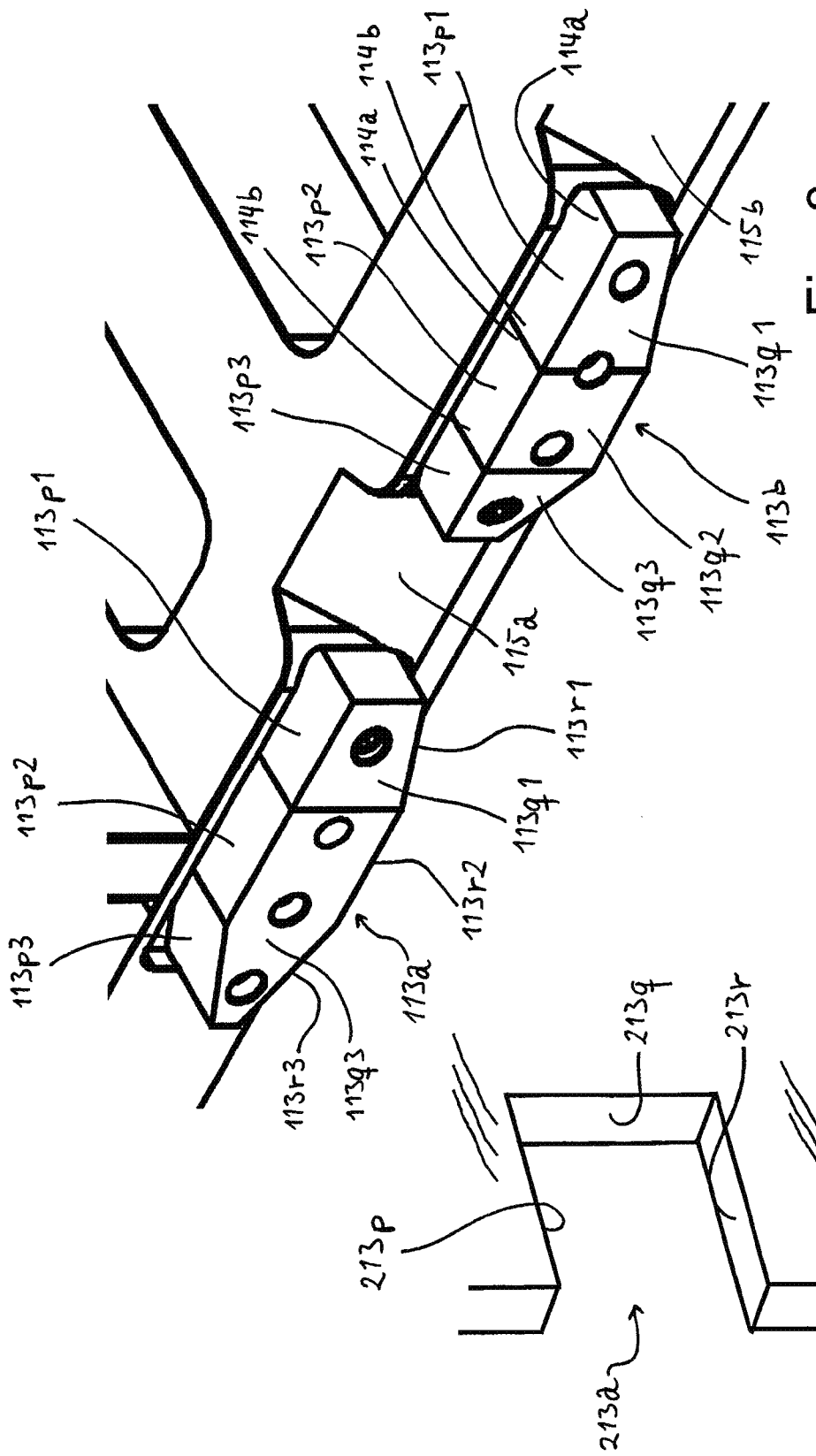

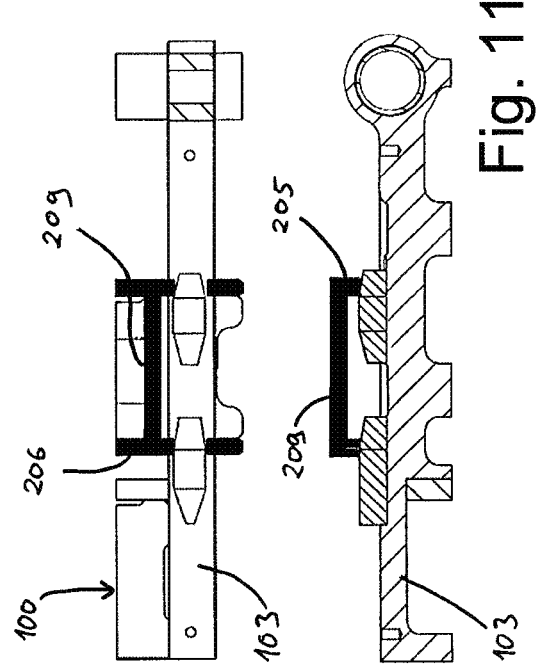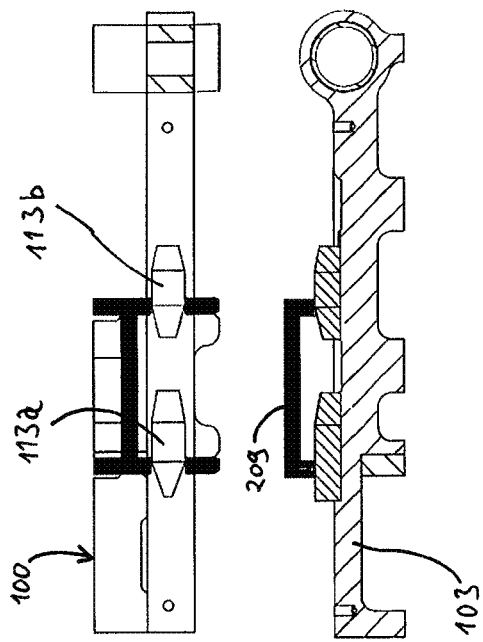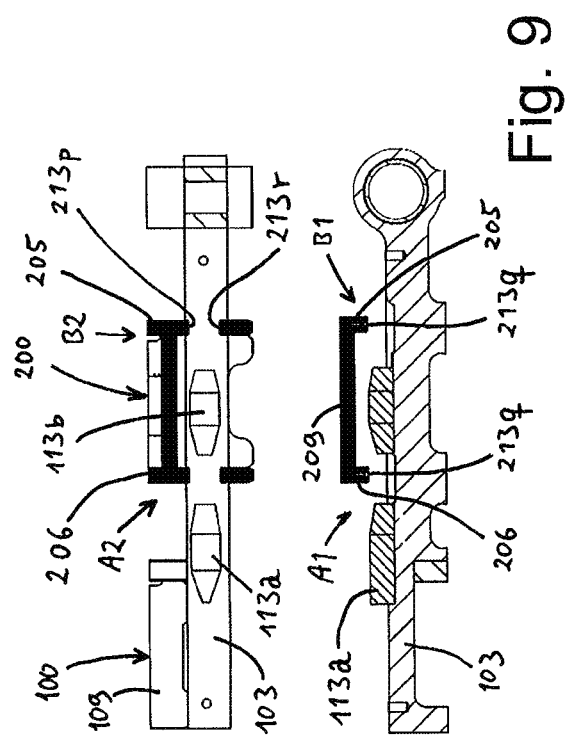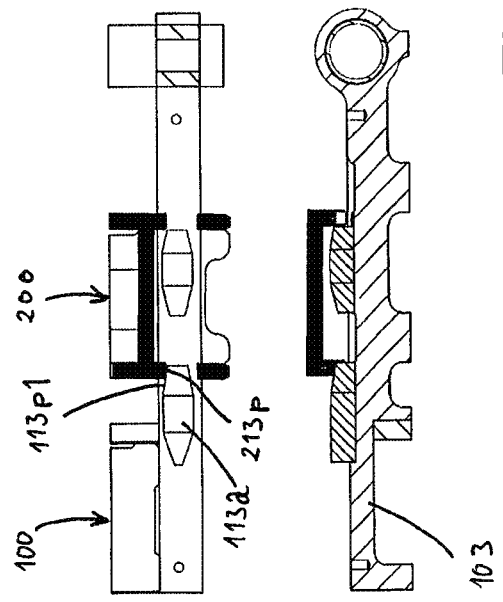

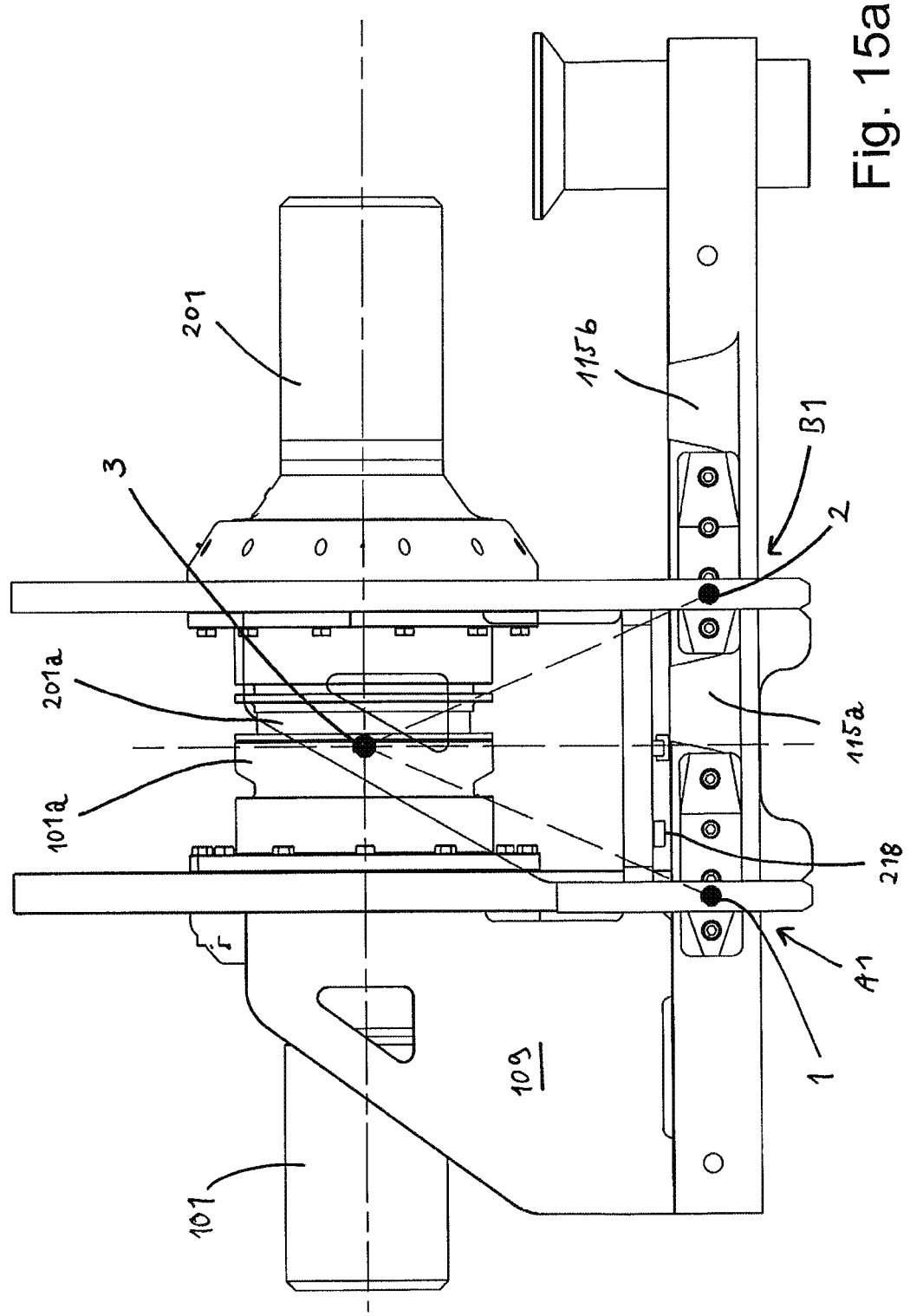

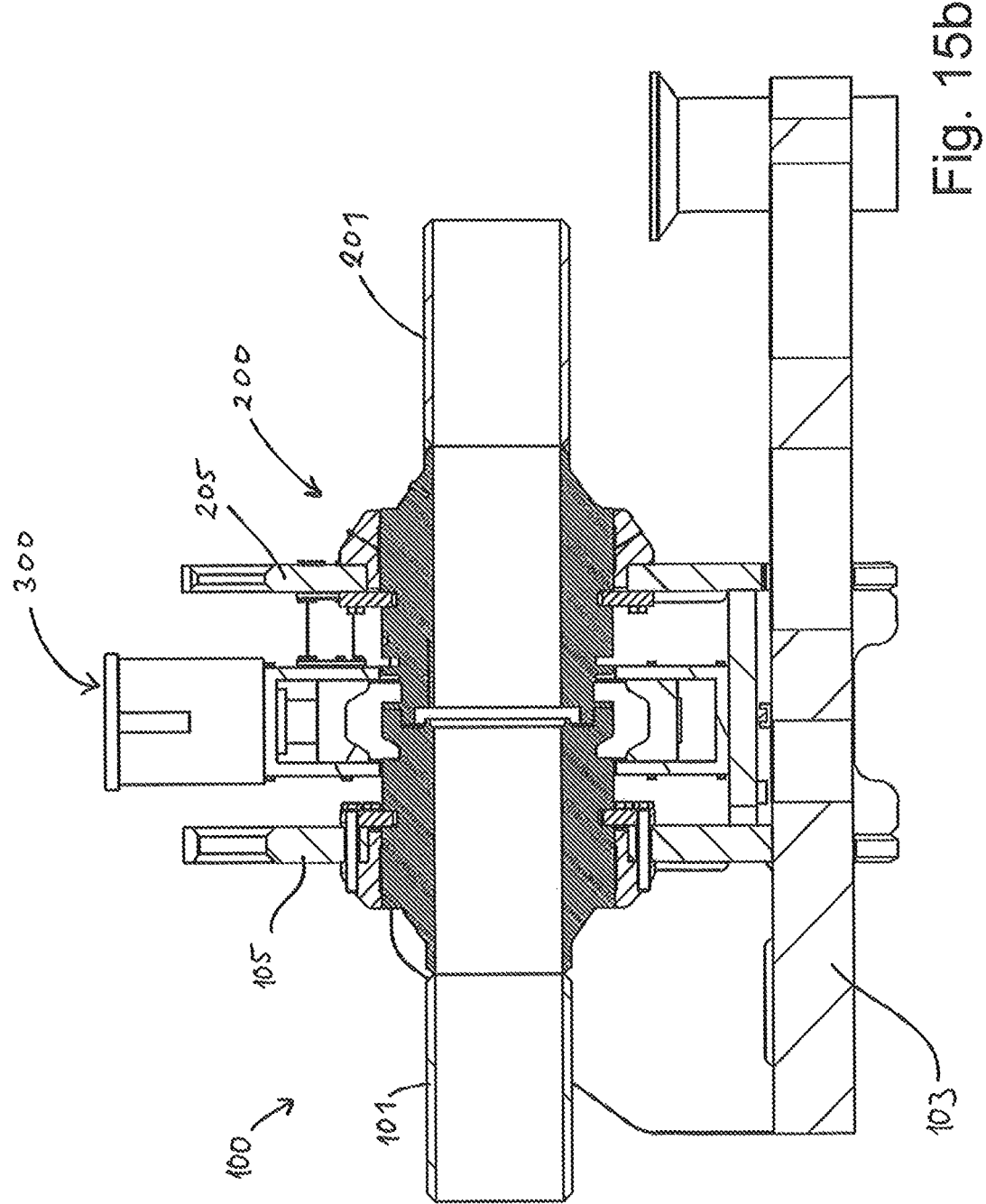

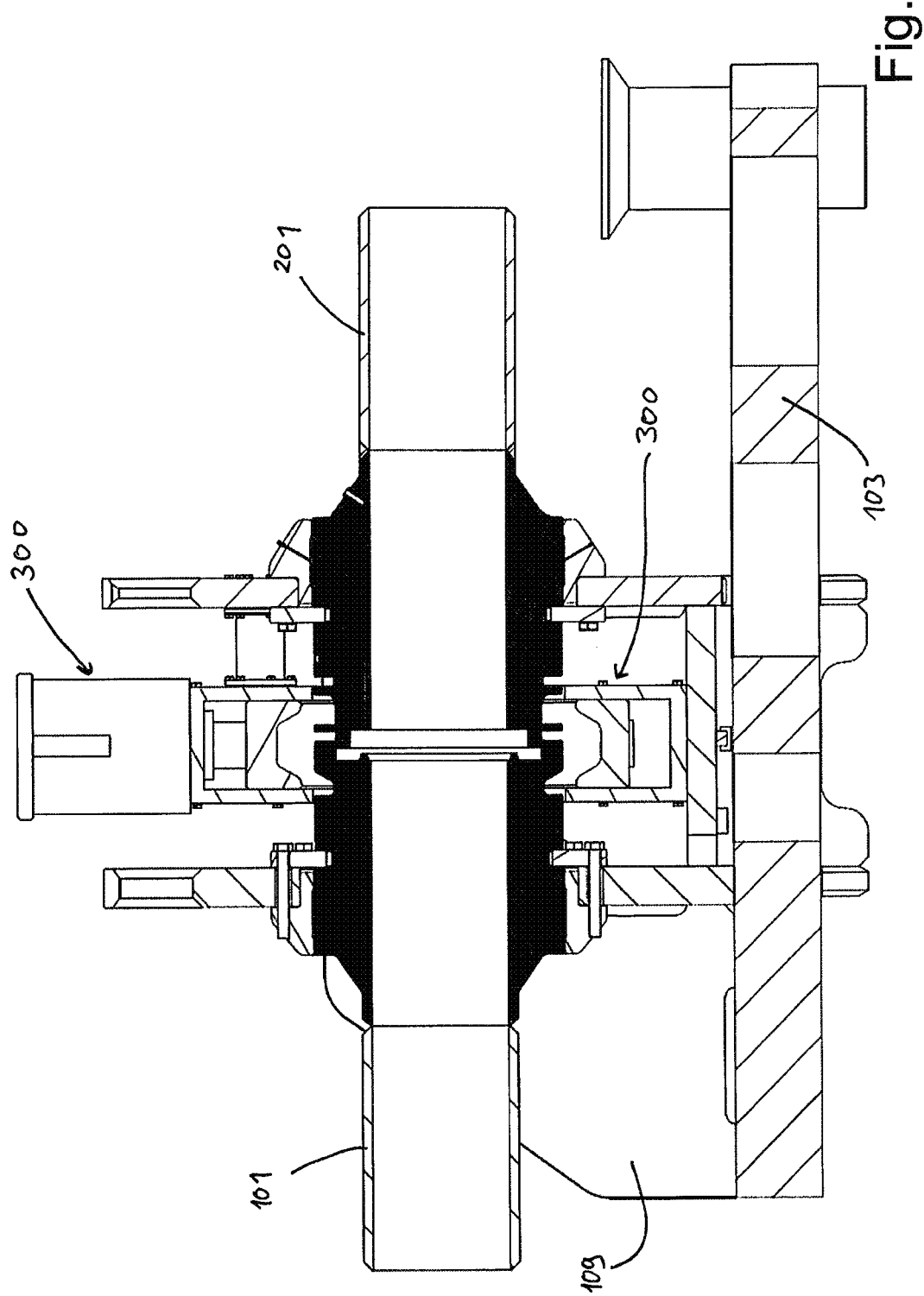

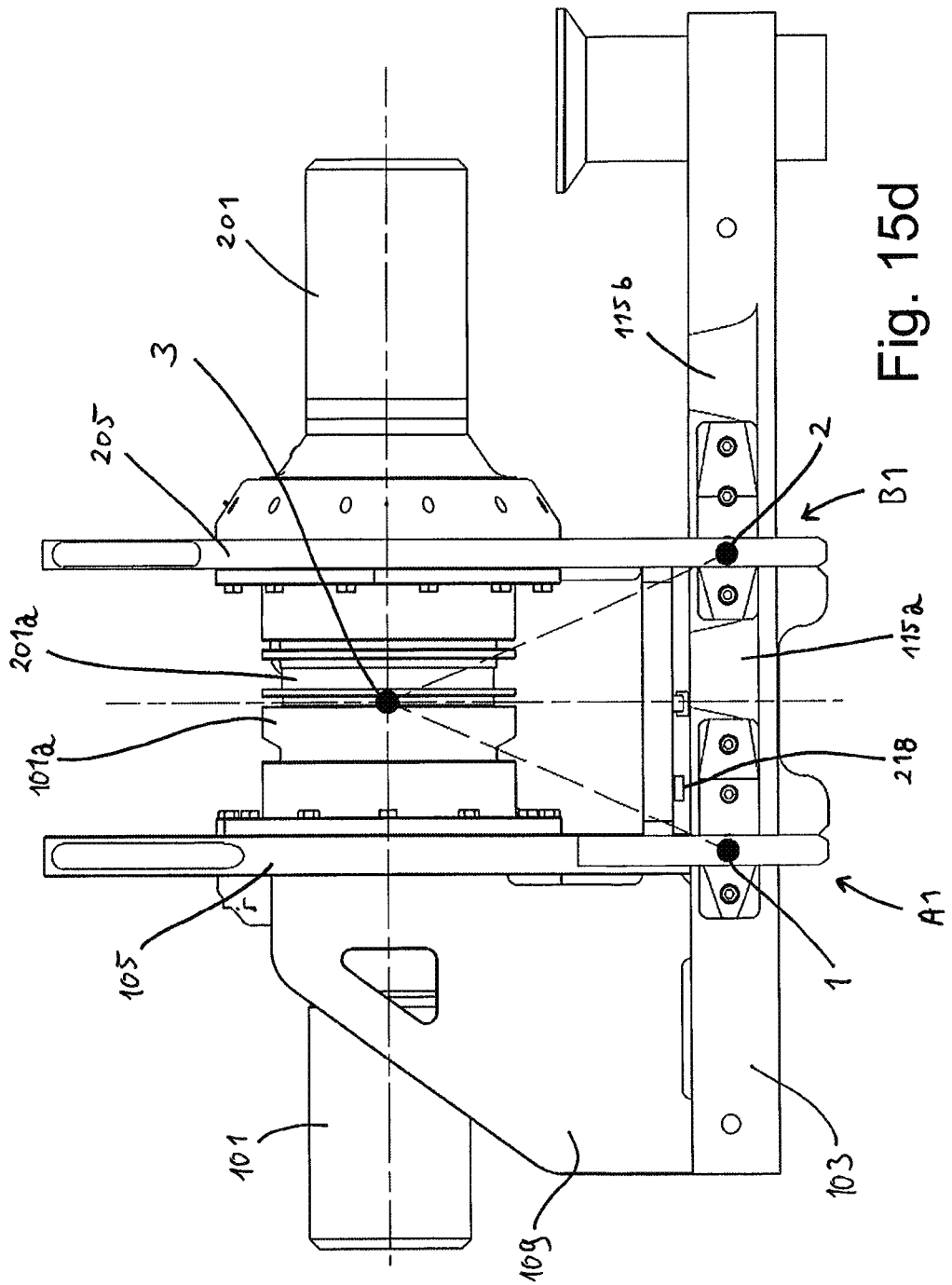

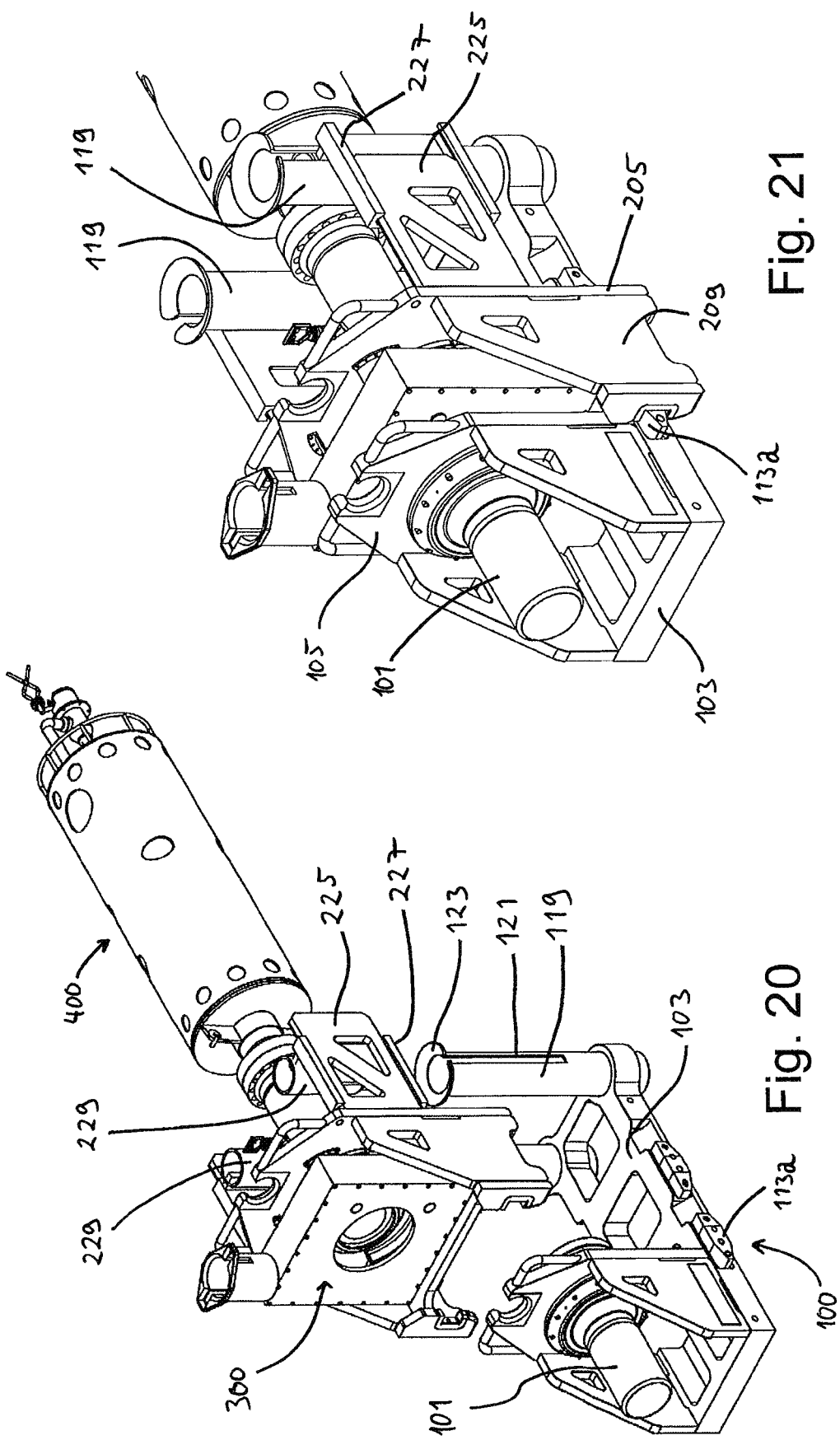

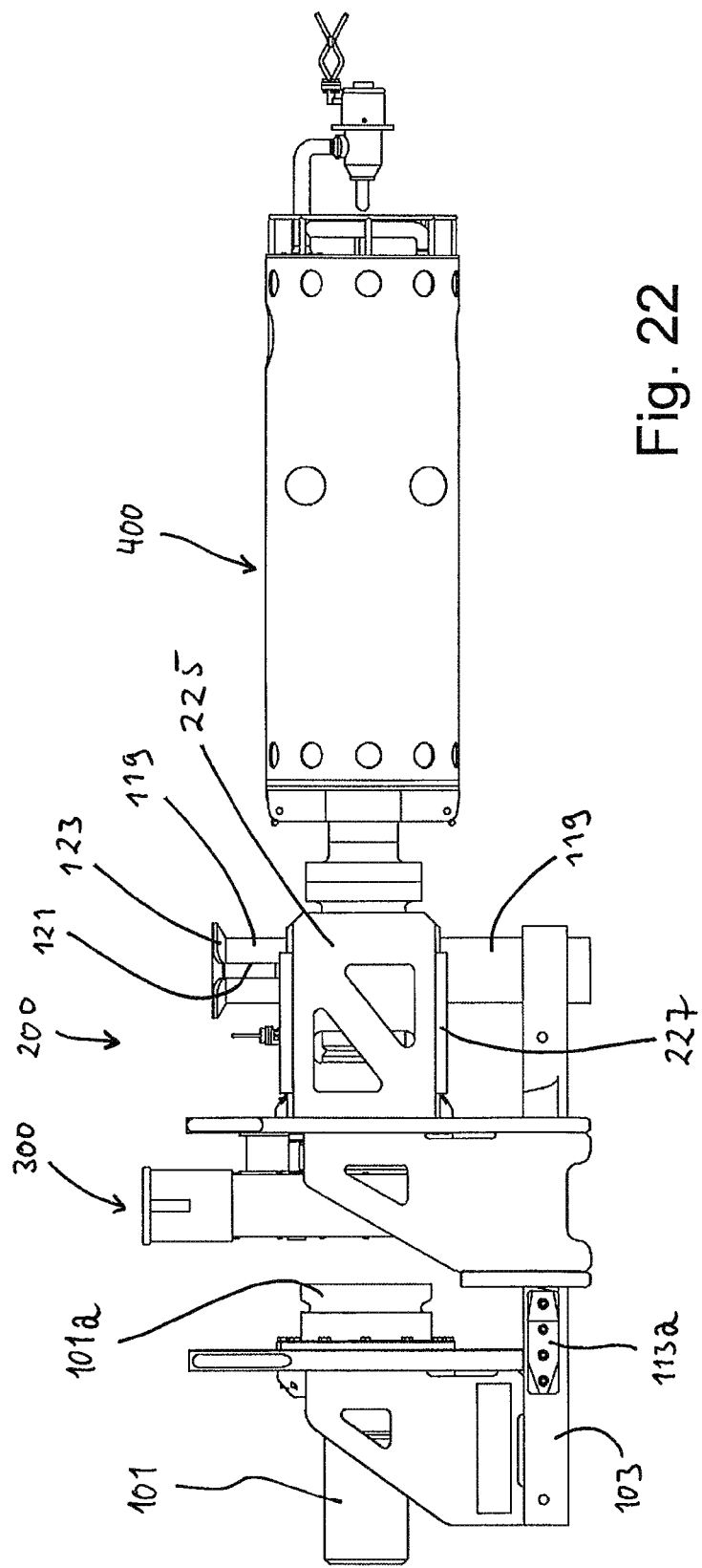

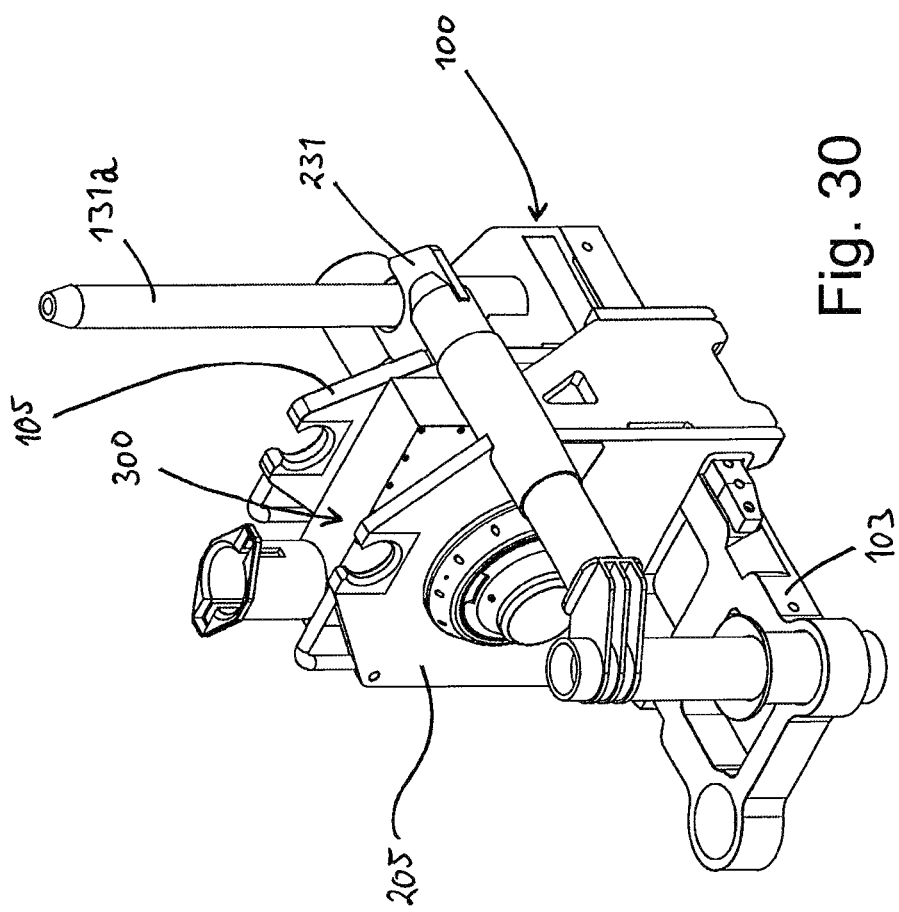

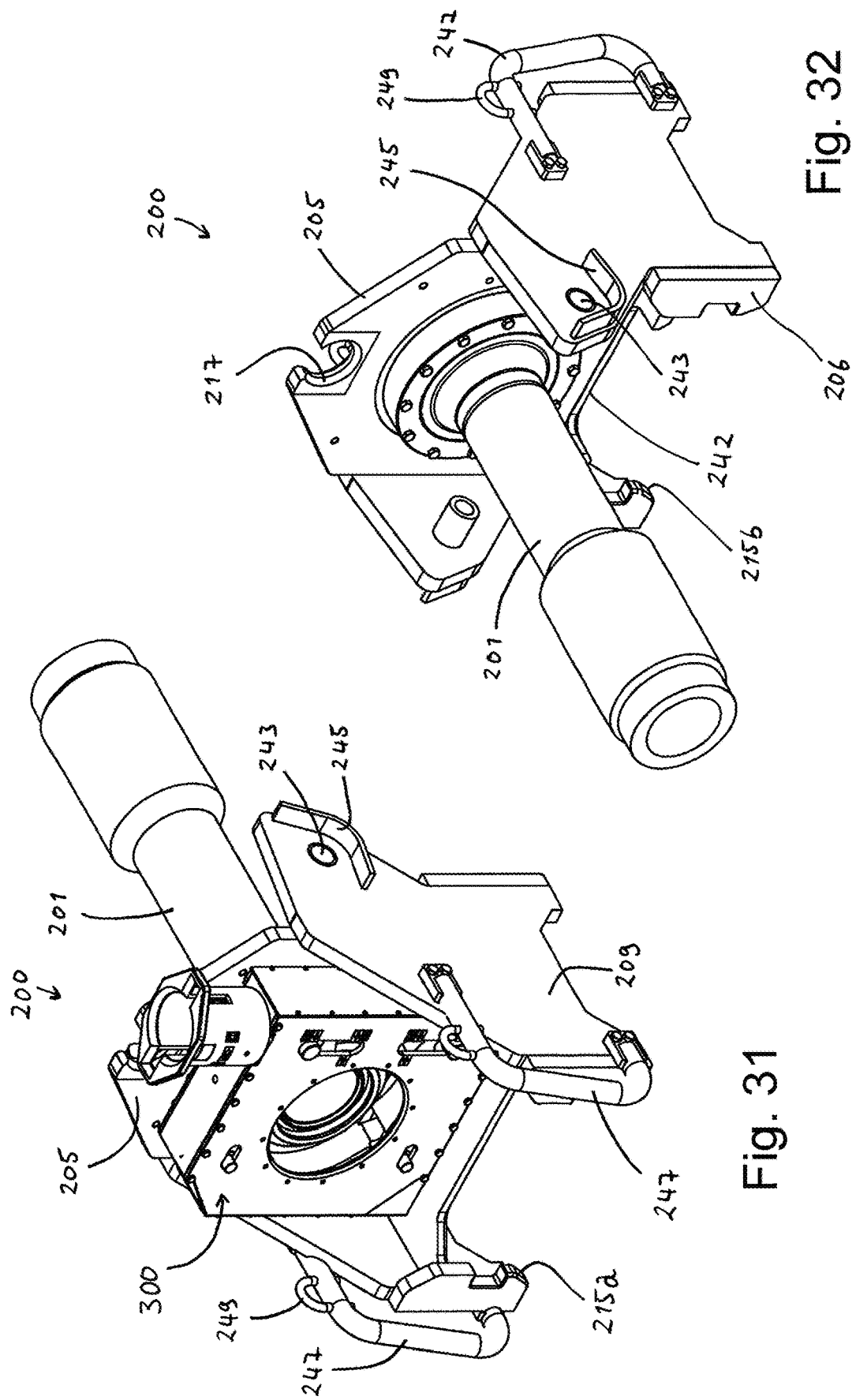

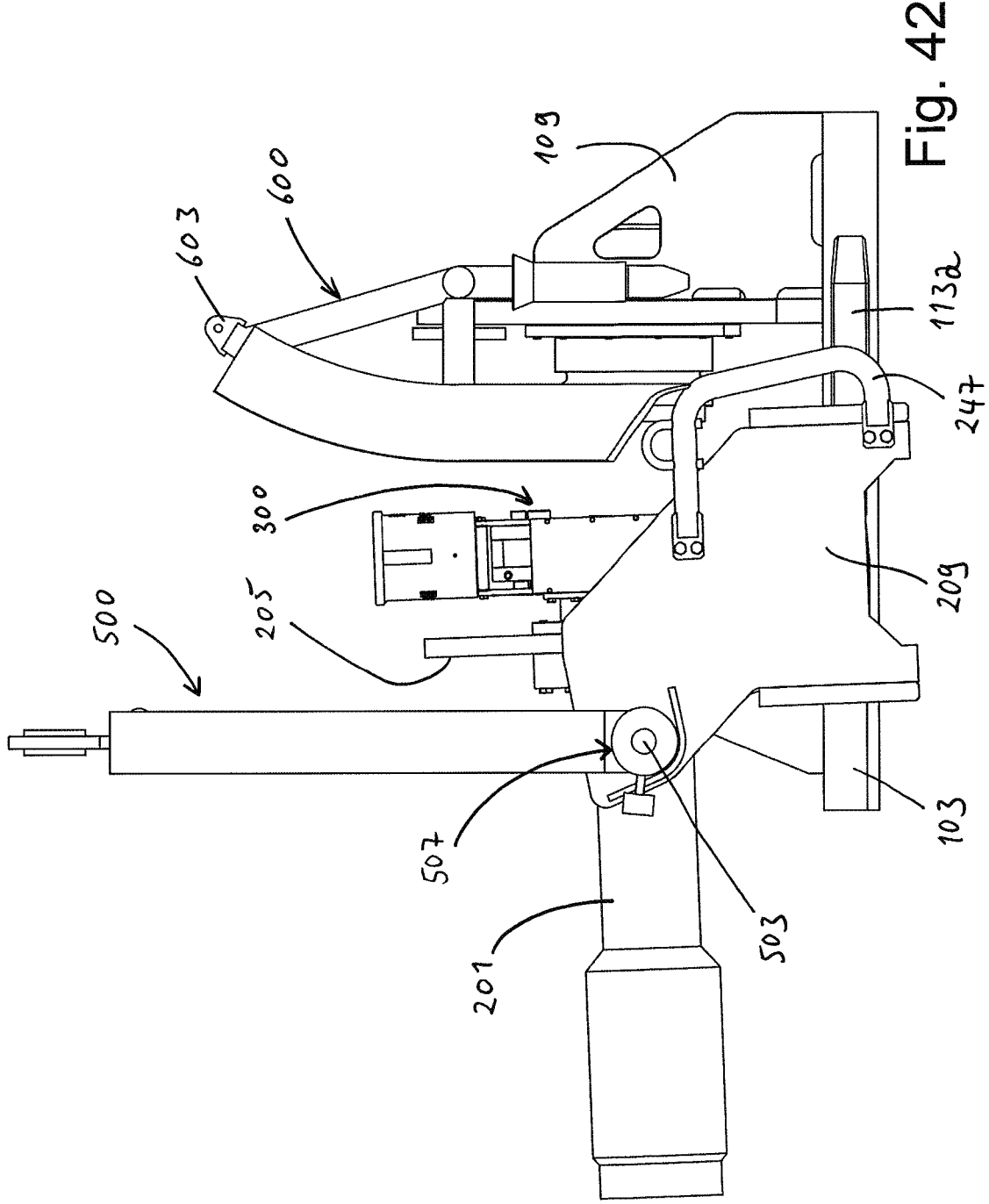

HORIZONTAL SUBSEA TIE-IN SYSTEM

TECHNICAL FIELD

The present invention relates to a pipeline tie-in system. Such systems are typically configured to connect to pipeline end terminations, such as for connecting two pipeline ends with a tie-in spool.

BACKGROUND ART

In the prior art there are described a plurality of different solutions for connecting the termination head of a subsea pipeline to a tie-in structure. Typically, an end of a long steel pipeline is arranged in the vicinity of a subsea facility, such as a well template or a subsea processing facility. With the tie-in structure, fluid communication is provided between the pipeline and the facility in question.

An example of such a system from the prior art is disclosed in European patent publication EP2722479. Here, a termination part is landed onto a porch part on the seabed. During landing, the termination part is guided on a guide post extending up from the porch part. Also, landing guiding means are arranged to ensure correct landing. The termination part and the porch part each comprises a hub that constitutes the end of a pipe. For connection of the two hubs, the termination part is equipped with a connector. The connector engages the two facing hubs, and clamps them together into a secure, sealed connection.

After landing, the termination hub is moved towards the porch hub with a horizontal movement. Typically in the art, this movement is brought about by means of a stroke tool. In EP2722479, the stroke tool is an integrated part of the termination part. In other prior art solutions, a separate, removable stroke tool is common. During the horizontal movement, guiding means ensures that the two approaching hubs are aligned sufficiently for the connector to make up the final connection. This alignment involves aligning the mutual position as well as angular alignment.

In EP2722479, as well as other known solutions, the guiding means comprises a horizontally extending guide pin which is configured to enter into a horizontal guide bore. To align the two hubs with respect to directions crosswise to their axial center axis, a relatively short engaging distance between the guide pin and guide bore is needed. However, to ensure angular alignment, the distance along which the guide bore and guide pin engages, is more relevant. That is, to ensure a detailed angular alignment and/or to be able to take up bending forces from the pipes to which the hubs are attached, there must be a sufficient engagement distance.

Publication US20120160505 discloses another solution with a termination part that lands on a porch part, with a connector arranged to the termination part. Horizontally extending guiding means of the termination part and porch part, respectively, engage each other when the termination part is moved horizontally towards the connected mode. The guiding means create a force transferring structure to relieve forces from the connector.

Other solutions having guiding means based on the guide pin and guide bore principle are disclosed in U.S. Pat. No. 7,503,727 and WO2015197539.

While being a well-known solution for angular alignment and position alignment, the guide pin and guide bore solution has some challenges. For instance, they need to be produced and to be attached to the respective porch part and termination part with detailed tolerances. Furthermore, they occupy considerable space. Also, as discussed above, they require a relatively long axial movement in order to provide for angular alignment and to take up bending forces.

An object of the present invention may be to provide an alternative solution that solves any one or more of the above presented challenges.

SUMMARY OF INVENTION

According to a first aspect of the present invention, there is provided a subsea horizontal tie-in system comprising a porch part with a porch hub, a termination part with a termination hub, wherein the termination part is configured to land on the porch part. The tie-in system further comprises an alignment system configured to align the porch hub and the termination hub during movement of the termination hub towards the porch hub in a landed state, wherein the alignment system comprises guide arrangements having porch guide faces on the porch part and termination guide faces on the termination part, wherein the porch guide faces and termination guide faces are configured to slide against each other during said movement. According to the invention, the porch part comprises a base plate on which the porch guide faces are arranged.

According to some embodiments of the invention, the porch part can further comprise a connection plate attached to and extending vertically up from the base plate, wherein the connection plate connects to the porch hub and faces in a direction parallel to the axial center axis of the porch hub, and wherein the base plate is manufactured from a single metal plate.

The alignment system can further comprise two forward guide arrangements and two aft guide arrangements at an axial distance from the two forward guide arrangements, wherein the forward and aft guide arrangements comprise the porch guide faces and termination guide faces.

Advantageously, in some embodiments of the invention, when the subsea horizontal tie-in system is in a connected position,
 the two forward guide arrangements are arranged at a forward axial position, on respective lateral sides and below the axial center axis;
 the two aft guide arrangements are arranged at an aft axial position, on respective lateral sides and below the axial center axis;
 there is an axial distance between the forward axial position and the aft axial position; and
 a central hub position is arranged axially between the forward and aft axial positions and laterally between the two pairs of guide arrangements on respective lateral sides of the axial center axis,
 wherein the central hub position is arranged on the axial center axis of the porch hub and the termination hub, and at an axial position where the porch hub and the termination hub are configured to abut each other.

The central hub position is thus a position on the axial center axis of the hubs, at a position where the two hubs engage each other. Typically, this axial position is the position of the abutting hub faces, which abut during engagement of the two hubs when being connected. Such abutting hub faces typically extend circumferentially about the axial center axis.

Moreover, with such embodiments, the central hub position can be arranged centrally between the forward axial position and the aft axial position, and the central hub position can be arranged centrally between the respective two pairs of guide arrangements, on respective lateral sides of the axial center axis. Here, the term "centrally between"

means that the central hub position is arranged with identical axial distance to the forward and aft axial positions. As will be discussed below, this is advantageous during the angular alignment of the two hubs. Notably, with such an embodiment, when seen from the side, the forward position, axial position, and central hub position together form an isosceles triangle. Moreover, when seen from above, the positions of the two forward guide arrangements form an isosceles triangle with the central hub position, the shape and size of which is identical to an isosceles triangle formed by the positions of the two aft guide arrangements and the central hub position. As will be discussed further below, during alignment the facing hubs will pivot about the central hub position.

According to some embodiments of the present invention, the guide arrangements can advantageously comprise guiding members and guide slots, wherein the guiding members are configured to extend into and slide against the guide slots. In such embodiments, the guiding members can comprise
a lateral guide face that is substantially vertical;
an upper guide face that is parallel to a substantially horizontal line orthogonal to the axial center axis of the porch hub; and
a lower guide face that is parallel to a substantially horizontal line orthogonal to the axial center axis of the porch hub;
wherein the upper and lower guide faces are substantially orthogonally oriented with respect to the lateral guide face.

Furthermore, with such embodiments, the guide slots can advantageously comprise
a lateral guide face, which is substantially vertical;
an upper guide face, which is parallel to a substantially horizontal line orthogonal to the axial center axis of the termination hub; and
a lower guide face, which is parallel to a substantially horizontal line orthogonal to the axial center axis of the termination hub;
wherein the upper and lower guide faces are substantially orthogonally oriented with respect to the lateral guide face.

Furthermore, with such embodiments, the lateral guide face, the upper guide face, and/or the lower guide face, respectively, of the guiding members can advantageously comprise an inclined front guide face and an axial guide face, wherein the inclined front guide face is inclined with respect to the porch hub center axis, while the axial guide face is parallel to the porch hub center axis.

The inclined front guide face can comprise a front part and a rear part, and the distance between the respective front parts of an inclined front guide face of a forward guiding member and an aft guiding member, on the same side of the base plate, respectively, can be less than the distance between respective front parts of a forward guide slot and an aft guide slot. In this manner, with such embodiments one ensures that the "climbing" occurring at a forward guide arrangement commences before the "climbing" at the aft guide arrangement.

In some embodiments according to the first aspect of the present invention, the base plate can comprise porch landing guide faces and the termination part can comprise termination landing guide faces. In such embodiments, the porch landing guide faces and termination landing guide faces can be configured to slide against each other when the termination part is landed on the porch part.

Furthermore, with such embodiments, two forward porch landing guide faces can be arranged between the porch guide faces of a forward guiding arrangement and an aft guiding arrangement, one on respective side of the base plate. This solution may contribute to limiting the axial extension of the tie-in system according to the invention.

Moreover, an aft guiding member of an aft guiding arrangement can advantageously be arranged on the base plate, in a position between a forward porch landing guide face and an aft porch landing guide face.

In some embodiments of the first aspect of the invention, the termination part can comprise a main plate surrounding and facing in a direction parallel to the axial center axis of the termination hub, wherein the main plate comprises
aft termination landing guide faces that are configured to slide on aft porch landing guide faces, and
aft guide slots that are configured to receive aft guiding members of the porch part.

Advantageously, the main plate may comprise a stroke tool interface, for instance arranged at the top of the plate. Moreover, in a similar fashion, a stroke tool interface may be arranged in the connection plate of the porch part.

The termination part may in some embodiments further comprise two vertically extending and parallel to the center axis of the spool hub extending aft plates, of which one aft plate is arranged on respective lateral side of the center axis, wherein the aft plates connect the main plate to
forward termination landing guide faces that are configured to slide on forward porch landing guide faces; and
forward guide slots configured to receive forward guiding members of the porch part.

In a further embodiment of the subsea horizontal tie-in system according to the invention, the termination part may further comprise a first alignment means arranged at a first axial side of the termination hub and a second alignment means arranged at a second, opposite side of the termination hub. The first and second alignment means can be connected to each other in a fixed manner and can further be connected to the rest of the termination part with an axially sliding connection.

Such an embodiment of the tie-in system is well configured for use with a flexible flowline, i.e. when the termination part is connected to the end of a flexible flowline that shall be connected to the porch part at the seabed.

Advantageously, the first and second alignment means can be connected to each other by means of a sliding cylinder, which is supported in a support sleeve.

In other embodiments, the termination part can be configured to be connected to or comprise a pig launcher/pig receiver. The porch part can then comprise a moment absorbing guide means, which is configured to absorb bending moment resulting from the weight of the pig launcher/pig receiver, or another component (typically a heavy component resulting in significant bending moment due to the weight). The termination part can comprise a guide means engagement arrangement, which is configured to engage the bending moment absorbing guide means and to transfer a bending moment to the moment absorbing guide means. The guide means engagement arrangement is configured to slide in an axial direction with respect to the pig launcher/pig receiver, as an axial sliding arrangement connects the guide means arrangement to the pig launcher/pig receiver with an axially sliding connection.

With the term "slide in an axial direction" is herein meant that the guide means engagement arrangement can move with respect to the pig launcher receiver in the axial direction, and advantageously in the axial direction only, while bending moment resulting from the weight of the PLR is transferred to the moment absorbing guide means.

While the tie-in system according to this embodiment is advantageous for tie-in of a pig launcher/pig receiver, it shall be clear that it also may involve use with other connected components that result in a bending moment at its connection interface with the termination part.

Moreover, with such an embodiment, the bending moment resulting from the weight of a pig launcher/pig receiver, or other connected component, is transferred to the base plate of the porch part.

In some embodiments, the said axial sliding arrangement can comprise two guide plates with parallel upper and lower, axially extending edges, which are arranged within axially extending guide slots.

In some embodiments, the guide plates may be fixed to the guide means arrangement, while the guide slots are fixed with respect to the pig launcher/pig receiver (or other component) (i.e. the rest of the termination part). In other embodiments, the guide plates may be fixed with respect to the pig launcher/pig receiver (or other component), while the guide slots may be fixed to the guide means arrangement.

The moment absorbing guide means may comprise a vertically extending stab receptacle with a vertically extending slit. A mechanical connection between the axial sliding arrangement and the guide means engagement arrangement may then extend through the slit.

Further possible embodiments of the subsea horizontal tie-in system according to the invention may involve combinations of the various components and solutions disclosed herein.

According to a second aspect of the present invention, disclosed is a method of providing a porch part of a subsea horizontal tie-in system, wherein the porch part comprises a vertically arranged connection plate to which a porch hub is attached, a base plate to which the connection plate is attached, and porch guide faces that are configured to slide against termination guide faces of a termination part. According to the second aspect of the invention, the method comprises the following steps:
a) cutting the base plate out of a single metal plate;
b) attaching the connection plate to the base plate in a permanent manner;
c) after step b), machining the porch guide faces while they are attached to or being part of the base plate, or machining attachment faces on the base plate, onto which guiding members comprising the porch guide faces are configured to be attached.

The attachment faces may be faces machined directly into the material of the base plate, and are faces onto which the guiding members can be attached, typically by bolts.

According to some embodiments of the second aspect of the invention, step c) may comprises one of the following:
machining the porch guide faces directly in the material of the base plate;
machining attachment faces directly in the material of the base plate, then attaching guiding members to the attachment faces; or
machining attachment faces directly in the material of the base plate, then attaching guiding members to the attaching faces, and then machining the guide faces of the guiding members.

In some embodiments, step c) may further comprise machining a porch hub attachment interface in the connection plate.

By machining the porch hub attachment interface in the connection plate after having attached the connection plate to the base plate, one obtains that the mutual position between the porch hub and the porch guide faces is correct. That is, one obtains smaller tolerances, since the positioning of the connection plate onto the base plate will not contribute to positional error.

According to another embodiment of the invention, the subsea horizontal tie-in system may further comprise a guide frame configured to land on the porch part, wherein the guide frame comprises a guide frame landing alignment means and a guide frame guide. The guide frame guide can be configured to guide the termination part during landing of the termination part onto the porch part.

It shall be understood that the term guide frame is not intended to limit the meaning to a frame as such. I.e. the guide frame can have another configuration than a frame, such as a plate or other configuration.

The guide frame can be installable on the porch part and can be retrievable from the porch part when the porch part is in an installed, subsea position. Also, it can be installable and/or retrievable when the termination part is in a non-installed position on the porch part and in a landed position on the porch part. Notably, the guide frame will be removed before using a stroke tool to move the termination hub horizontally towards the porch hub.

That is, the guide frame can be installed and retrieved from the porch part at any situation, except during the landing or retrieving process of the termination part onto or away from the porch part.

The porch part can further comprise a porch guide profile that extends with an inclination with respect to the vertical and horizontal direction, wherein the porch guide profile is configured to engage the termination part during landing of the termination part, such that the termination part is moved forward towards the porch hub due to the engagement between the termination part and the porch guide profile.

Said engagement between the termination part and the porch guide profile can be configured to move the forward guide slots of the termination part into engagement with the forward porch guiding members. In this manner, the engagement between the porch guide profile and the termination part during landing, ensures that a weight applied on a rear end of the termination part, such as from a flexible hose, will not pivot the front part of the termination part upwards. This retainment occurs due to the engagement between the forward guide slots and the forward porch guiding members.

The porch guide profile and the guide frame guide can be configured to guide the termination landing guide faces towards engagement with the porch landing guide faces.

According to another aspect of the invention, there is provided a subsea horizontal tie-in system comprising a porch part with a porch hub, a termination part with a termination hub, wherein the termination part is configured to land on the porch part, and an alignment system configured to align the porch hub and the termination hub during movement of the termination hub towards the porch hub in a landed state. According to this aspect of the invention, the subsea horizontal tie-in system further comprises a guide frame with a guide frame landing alignment means and a guide frame guide. The guide frame guide is configured to guide the termination part during landing of the termination part onto the porch part. The guide frame is installable onto the porch part before landing of the termination part and before retrieval of the termination part. The guide frame is retrievable from the porch part after landing of the termination part.

The guide frame may also be configured to guide the termination part when the termination part is retrieved from engagement with the porch part.

Advantageously, the guide frame will also prevent a collision between the termination part and the porch hub.

According to yet another aspect of the invention, there is provided a guide frame configured to be installed on and retrieved from a porch part of a subsea horizontal tie-in system. The guide frame comprises two guide frame pins configured to enter into engagement with the porch part and a guide frame landing support configured to arrest the position of the guide frame on the porch part. According to this aspect of the invention, the guide frame further comprises a guide frame guide configured to guide a termination part of said subsea horizontal tie-in system during landing.

The guide frame landing support can be configured to engage a stroke tool interface of the porch part when in the landed, installed position on the porch part.

BRIEF DESCRIPTION OF DRAWINGS

While the invention has been described in general terms above, a more detailed example of embodiment will be given in the following, with reference to the drawings, in which

FIG. 2b is a cross section side view of the system, corresponding to the position shown in FIG. 2a;

FIG. 3 is another perspective view of the system, showing the same situation as in FIG. 2a;

FIG. 4 is a side view of the subsea horizontal tie-in system according to the invention, shown in an aligned and connected state;

FIG. 7 is a principle view of a detail of the system, illustrating guide faces of a guide slot;

FIG. 8 is another enlarged perspective view, showing parts of the porch part without the termination part;

FIG. 9 to FIG. 12 depict principle illustrations of four succeeding stages between an initial landed position and a final aligned and connected position;

FIG. 15a is a schematic side view of the subsea horizontal tie-in system according to the invention, illustrating the mutual position of between guide arrangements and a central hub position, in a situation when the hubs are engaged;

FIG. 15b is a schematic cross section side view of the subsea horizontal tie-in system according to the invention, illustrating the mutual position between guide arrangements and a central hub position, wherein stroke action is completed with male and female hubs being fully entered;

FIG. 15c is a schematic cross section side view of the subsea horizontal tie-in system according to the invention, illustrating the mutual position between guide arrangements and a central hub position, wherein stroke action is partially completed with male and female hubs being partially entered;

FIG. 15d is a schematic side view of the horizontal tie-in system according to the invention, illustrating the mutual position of between guide arrangements and a central hub position, in a situation when the hubs are partially entered, corresponding to the situation shown in FIG. 15c;

FIG. 20 is a perspective view of the system shown in FIG. 19;

FIG. 21 is a perspective view of the system shown in FIG. 19, after tie-in of the termination part;

FIG. 22 is a side view of the system shown in FIG. 19, after landing;

FIG. 30 is a perspective view of the system shown in FIG. 28, after connection;

FIG. 31 is a perspective view of the termination part according to an alternative embodiment;

FIG. 32 is a perspective view of the termination part shown in FIG. 31, seen from another angle;

FIG. 42 is a side view of the components shown in FIG. 38;

DETAILED DESCRIPTION OF THE INVENTION

Figure 1:
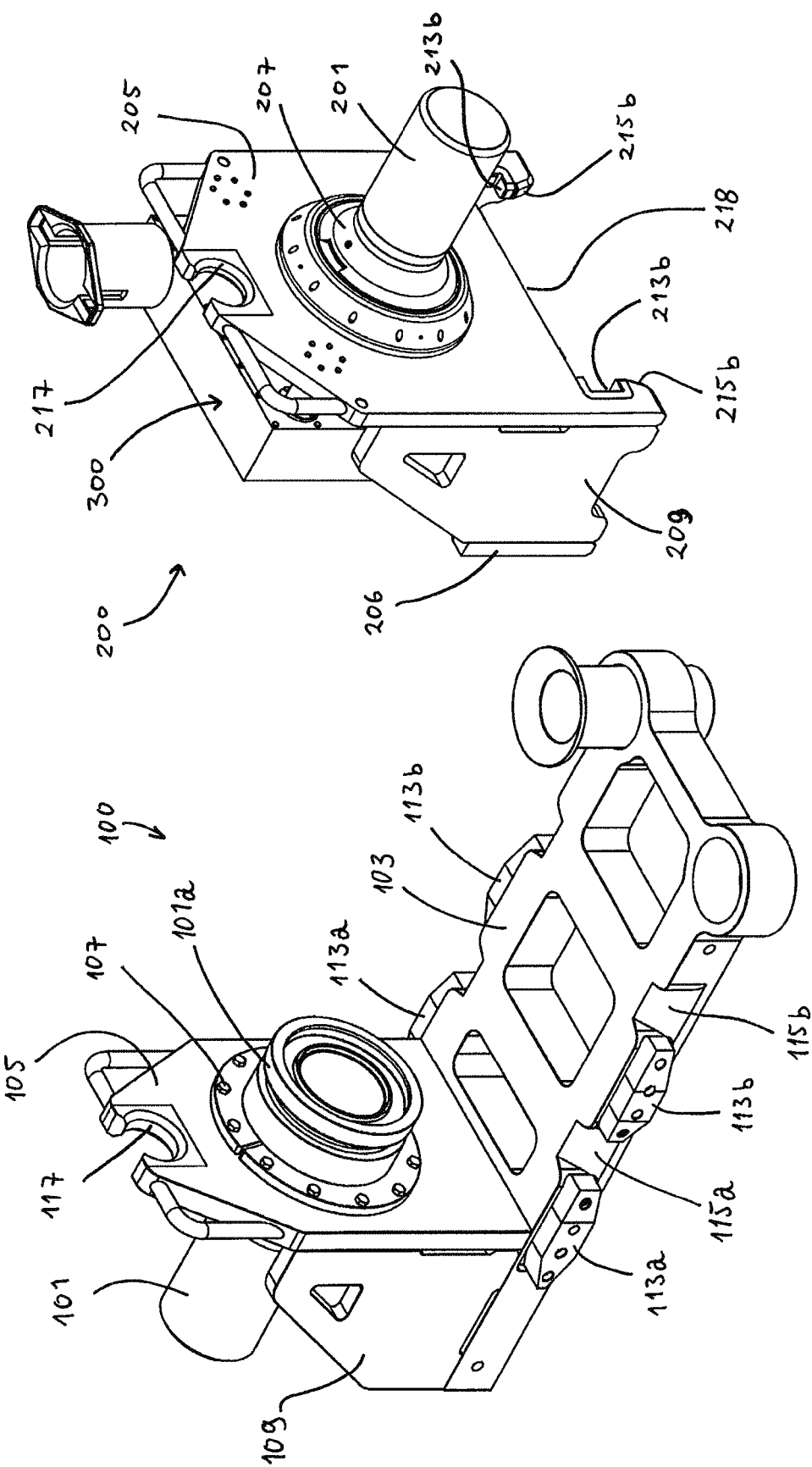
FIG. 1 is a perspective view of a subsea horizontal tie-in system according to the invention, shown in a non-landed state.

FIG. 1 depicts an embodiment of the horizontal pipeline tie-in system according to the first aspect of the invention, with a perspective view. The tie-in system comprises three main parts, a porch part 100, a termination part 200 and a connector 300. The porch part 100 is typically a stationary part arranged at an end of a subsea pipeline. A small length of such a pipeline 101 is indicated.

The porch part 100 comprises a base plate 103, typically cut out from a single metal plate. Vertically up from the base plate 103 extends a connection plate 105. The end portion of the pipeline 101 is connected to the connection plate 105 by means of a plurality of bolts 107 in a conventional fashion. Advantageously, a swivel is arranged so that the pipeline 101 is free to rotate with respect to the connection plate 105. A pair of support plates 109 (only one visible in FIG. 1) contribute in securing the connection plate 105 to the base plate 103.

The termination part 200 is shown on the right hand side in FIG. 1. It is typically attached to the end of a tie-in spool 201, of which only the end portion is shown in FIG. 1. The termination part 200 has a vertical main plate 205, to which the end of the tie-in spool 201 is connected. Advantageously, the end portion of the tie-in spool 201 is connected to the main plate 205 with a swivel 207. Hence, the tie-in spool 201 is free to rotate about its longitudinal axis at the position of the termination part 200.

At the end of the pipeline 101 there is a porch hub 101a. Correspondingly, at the end of the tie-in spool 201, there is a termination hub 201a (visible in FIG. 15a and FIG. 16).

A connector 300 is connected to the termination part 200. The connector is a known device in the art, which is used for final connection of the two facing hubs 101a, 201a of the ends of the pipeline 101 and the tie-in spool 201. Once the two facing hubs are arranged within the capture envelope of the connector 300, actuation of the connector will force the two hubs into a connected position. In such a position, the two hubs are aligned and sealed, so that fluid may flow through the connection without leakage to the environment. Such fluid may typically include hydrocarbons from a subsea well.

In the situation shown in FIG. 1, the termination part 200 is about to be landed onto the base plate 103 of the porch part 100. In this situation, the termination part 200, being on the end of a tie-in spool 201, may be lifted with a ship crane. In order to land correctly onto the base plate 103, the position and orientation alignment of the termination part 200 is performed by entering the guide element 211 onto the guidepost 111, which are shown in FIG. 2. The entering onto the guidepost 111 can be done with assistance from a WROV (work type remotely operated vehicle) or via guidewires.

Figure 2A:
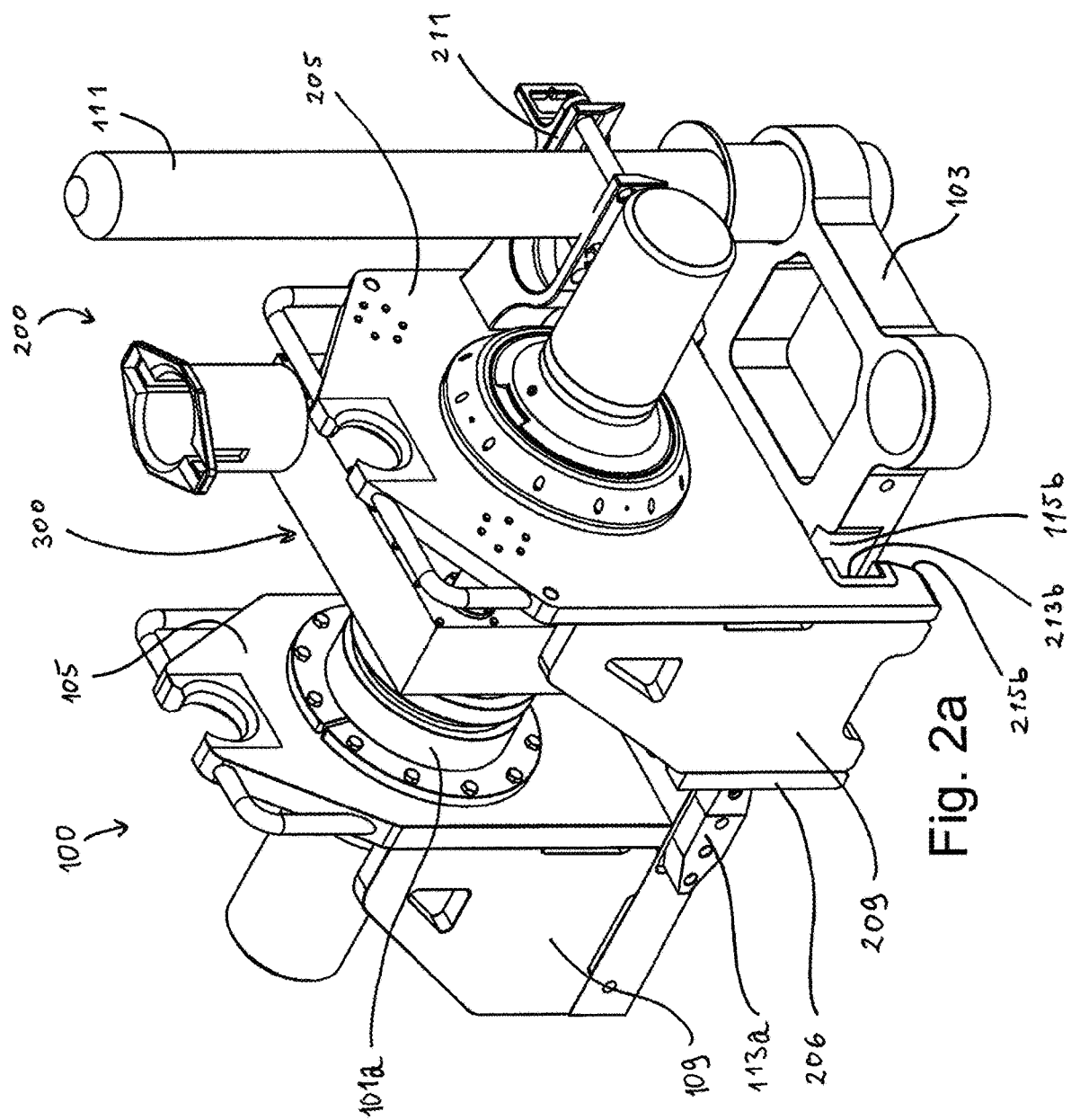
FIG. 2a is a perspective view of the system shown in FIG. 1, shown in a landed, but not yet aligned state.

FIG. 2a depicts the same components as shown in FIG. 1. In addition there is shown a guidepost 111 extending vertically upwards from the base plate 103. The guidepost 111 interacts with a guide element 211, which is connected to the main plate 205 of the termination part 200. In the position shown in FIG. 2a, the termination part 200 has been landed onto the porch part 100.

Two aft plates 209 are attached to the main plate 205 of the termination part 200. The aft plates 209 are arranged on respective lateral sides of the axial center axis of the end portion of the tie-in spool 201. The aft plates 209 extend forward from the main plate 205, i.e. towards the pipeline 101 in an axial direction, when in a landed position.

FIG. 2b depicts the situation shown in FIG. 2a with a cross section side view.

FIG. 3 is another perspective view of the situation shown in FIG. 2, seen from another angle. In this view, the connector 300 is better illustrated.

Figure 5:
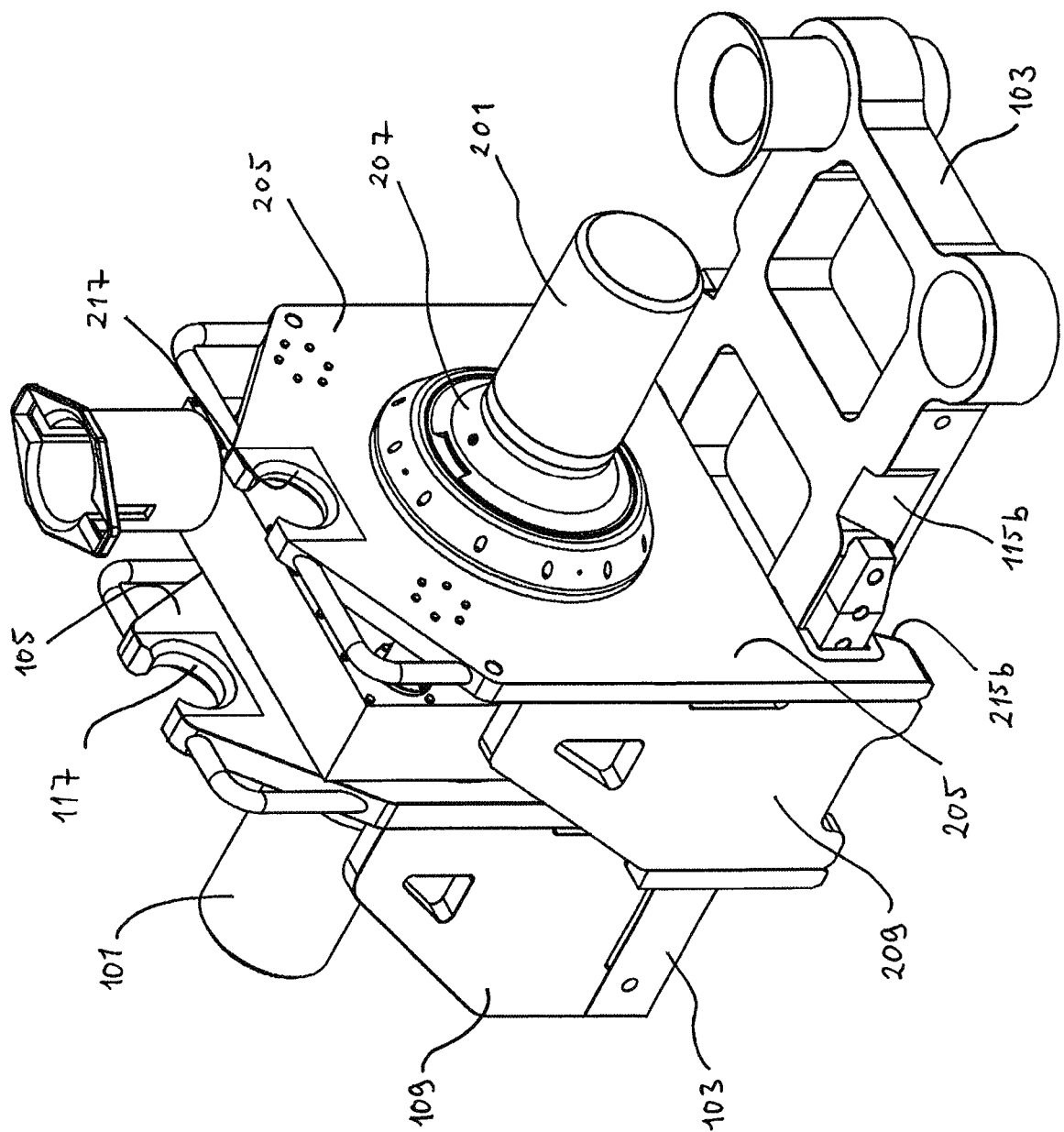
FIG. 5 is another perspective view, showing the same situation as in FIG. 4.

FIG. 4 is a side view of the horizontal tie-in system according to the described embodiment. In this view, the system is shown in a connected position. Thus, in this position, the end portion of the tie-in spool 201 has been aligned with the facing end portion of the subsea pipeline 101, and the connector 300 has been actuated for the final movement of the facing hubs 101a, 201a into the connected position. This position is also shown with the perspective view of FIG. 5.

Figure 16:
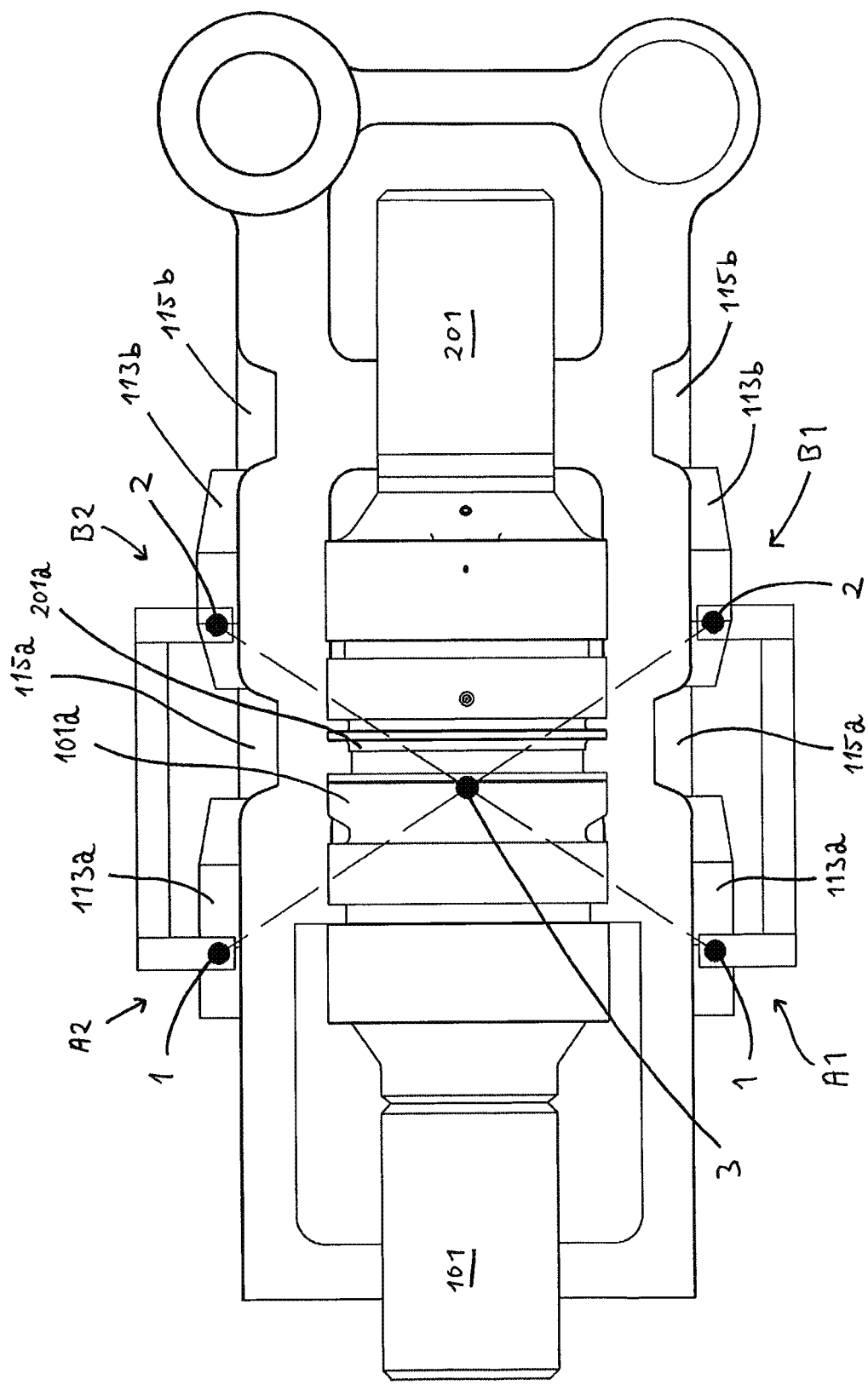
FIG. 16 is a schematic top view corresponding to FIG. 15a, illustrating the mutual position between guide arrangements and the central hub position.

After landing on the port part 100, the termination part 200 will be moved towards the connected position in a substantially horizontal direction. During this movement, the termination hub 201a will be aligned with respect to the porch hub 101a by means of an alignment system. In this embodiment, the alignment system comprises four guide arrangements, which are positioned at different places on the tie-in system according to the invention. The top view of FIG. 16 shows these four guide arrangements, while the side view of FIG. 15 shows two of them. More precisely, the alignment system according to this embodiment comprises two forward guide arrangements A1, A2 and two aft guide arrangements B1, B2. The position of the forward and aft guide arrangements A1, A2, B1, B2 will be discussed in more detail below. In the following, a further description of the tie-in system and in particular of the design of the guide arrangements A1, A2, B1, B2 will be given.

Reference is again made to FIG. 1 and to FIG. 3. Protruding out from the side of the base plate 103, there are two pairs of porch guiding members 113a, 113b. In this embodiment, two forward porch guiding members 113a are arranged at the same axial position. The two forward porch guiding members 113a are part of respective forward guide arrangement A1, A2. One forward porch guiding member 113a is on each opposite lateral sides of the base plate 103. At an axial distance from the two forward porch guiding members 113a, there are two aft porch guiding members 113b. The two aft porch guiding members 113b are part of respective aft guide arrangements B1, B2, and are also arranged at the same axial position (i.e. at a distance from the axial position of the forward guide arrangements A1, A2).

The termination part 200 is provided with two pairs of guide slots 213a, 213b. Two forward guide slots 213a are arranged on respective lateral sides of the termination part 200, and are parts of respective forward guide arrangements A1, A2. The forward guide slots 213a are configured to engage with the forward porch guiding members 113a. Thus, the porch part 100 has four porch guiding members 113a, 113b, which are configured to engage with four guide slots 213a, 213b arranged on the termination part 200. This engagement takes place after the termination part 200 has landed on the porch part 100, namely when the termination part 200 is moved horizontally towards the connected position. As discussed above, it is during this movement that the alignment system comes into use, for mutual alignment of the two facing hubs 101a, 201a. This will be described in further detail below.

Referring to FIG. 1, on the porch part 100 there are arranged four porch landing guide faces 115a, 115b. In the shown embodiment, the porch landing guide faces 115a, 115b are machined directly into the base plate 103. The porch landing guide faces are inclined with respect to the base plate 103, facing partially upwards and partially laterally outwards to the sides.

Two forward porch landing guide faces 115a are arranged axially between the forward porch guiding members 113a and the aft porch guiding members 113b. Two aft porch landing guide faces 115b are arranged axially on the other side of the aft porch guiding members 113b.

The termination part 200 is provided with four termination landing guide faces 215a, 215b. The termination landing guide faces 215a, 215b face in the opposite, inclined direction, as compared to the porch landing guide faces 115a, 115b. Corresponding to the porch landing guide faces 115a, 115b of the porch part 100, there are two forward termination landing guide faces 215a and two aft termination landing guide faces 215b. The forward termination landing guide faces 215a are configured to slide on the forward porch landing guide faces of the porch part 100. The aft termination landing guide faces 215b are configured to slide on the aft porch landing guide faces 115b.

The two aft termination landing guide faces 215b are arranged on an edge portion of the main plate 205. The two forward termination landing guide faces 215a are arranged on respective auxiliary plates 206 that are attached to the respective aft plates 209, cf. FIG. 3 and FIG. 1. The two auxiliary plates 206 are parallel with and in an axial distance from the main plate 205. This mutual distance corresponds to the axial distance between the two pairs of termination landing guide faces 215a, 215b. The distance also substantially corresponds to the axial distance between the two pairs of porch landing guide faces 115a, 115b.

The forward and aft guide slots 213a, 213b of the termination part 200 are arranged on the same axial position as the forward and aft termination landing guide faces 215a, 215b, respectively. Consequently, in this embodiment, the axial position of the main plate 205 and the two auxiliary plates 206 governs the axial distance between the two forward guide arrangements A1, A2 and the two aft guide arrangements B1, B2, during the aligning process (i.e. as the termination part is moved substantially horizontally towards the connected position).

The four sets of engaging porch landing guide faces 115a, 115b and termination landing guide faces 215a, 215b assist landing of the termination part 200 onto the porch part 100. Thus, they function as a guiding means in addition to the guiding engagement between the guide post 111 and the guide element 211 (cf. FIG. 2a).

The main plate 205 of the termination part 200 has a downwardly facing edge provided with a variable spacer, the surface of which constitutes a termination landing surface 218. When the termination part 200 lands on the porch part 100, the termination landing surface 218 lands on an upper face of the base plate 103 of the porch part 100.

In this described embodiment, stroke tool interfaces 117, 217 are provided on the upper parts of the connection plate 105 of the porch part 100 and the main plate 205 of the termination part 200, respectively. By installing a stroke tool (not shown) to the stroke tool interface 117, 217, the operator is able to pull the termination part 200 towards the connected position. As shown in this embodiment, the stroke tool interfaces 117, 217 are positioned at a high level on the porch part 100 and termination part 200. Such high positioning reduces impact from gravity during the stroking actions, as gravity tends to pull the projecting pipeline 101 and tie-in spool 201 downwards. Use of stroke tools are well known in the art and will not be further discussed.

Figure 6:
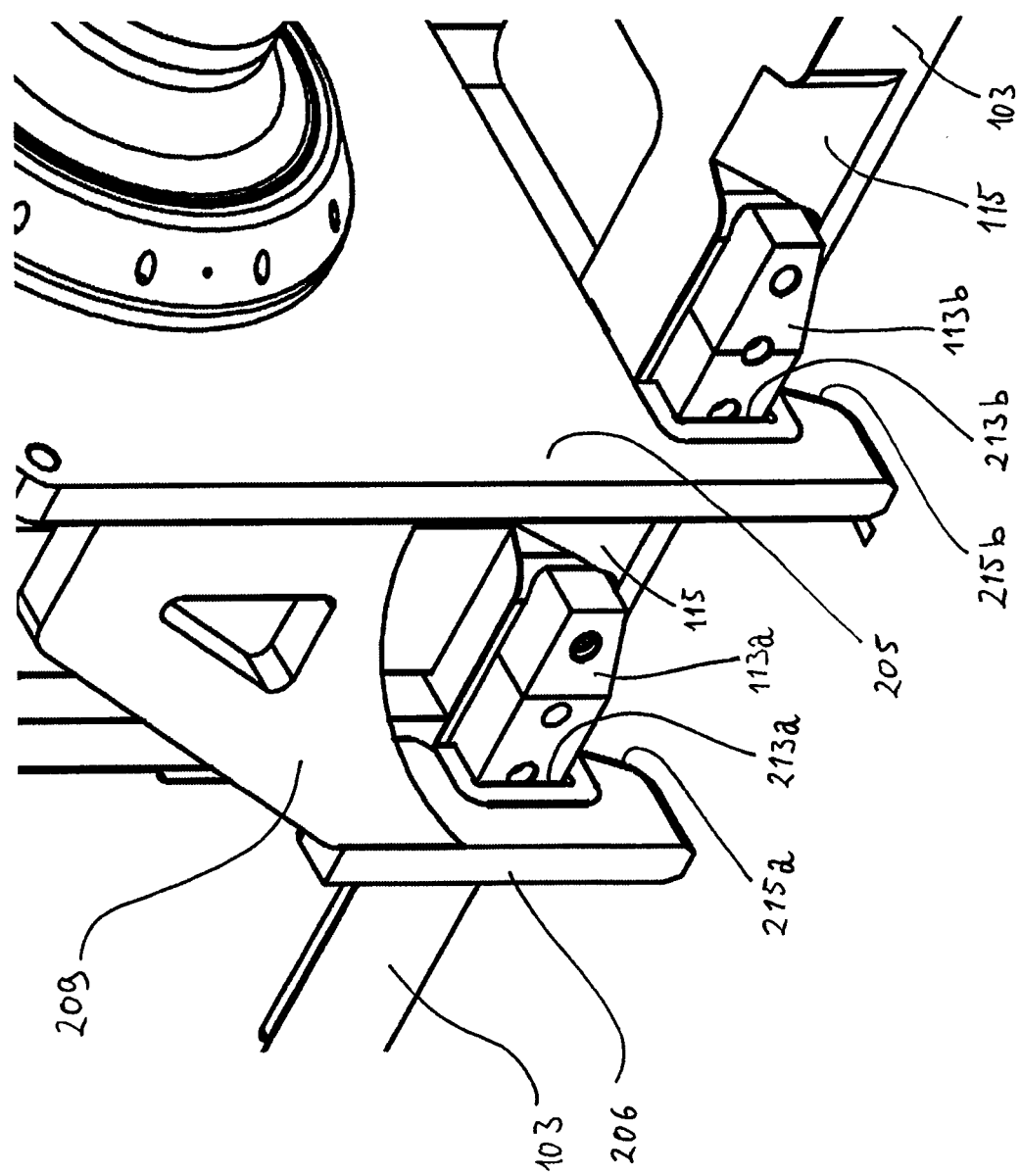
FIG. 6 is an enlarged perspective view, illustrating a section of the view in FIG. 5.

FIG. 6 is an enlarged section of a perspective view of the porch part 100 and termination part 200, in a position where the porch guiding members 113a, 113b and the termination guide slots 213a, 213b are in engagement with each other. In this illustration, a portion of the aft plate 209 of the termination part has been cut away make both the forward and aft porch guiding members 113a, 113b visible. As can be appreciated from FIG. 6, the guide slots 213a, 213b of the termination part 200 are shaped as pockets or grooves that receive the porch guiding members 113a, 113b. Hence, the engagement between the porch guiding members and the termination guide slots govern the mutual position of the porch part 100 and the termination part 200 in all directions crosswise to the axial direction. Since there is an axial distance, as discussed above, between the two front and the two rear pairs of porch guiding members and guide slots, the angular relationship between the porch part 100 and the termination part 200 will also be governed in the shown position (FIG. 6).

As now will be appreciated, in this embodiment of the tie-in system according to the invention, each guide arrangement A1, A2, B1, B2 comprises one porch guiding member (113a or 113b) and one guide slot (213a or 213b) (cf. also FIG. 15 and FIG. 16).

FIG. 7 is a principle view of one of the guide slots 213a arranged in the termination part 200. In this embodiment, the guide slot 213a has an upper guide face 213p, lateral guide face 213q, and a lower guide face 213r. All of these three guide faces are facing inwards towards a void which is configured to receive a porch guiding member 113a. In this embodiment, the forward guide slots 213a as well as the aft guide slots 213b have this shape, such as shown in FIG. 7.

Notably, with the shown embodiment, the lateral guide faces 213q of the guide slots 213a, 213b belonging to the same guide arrangement, are facing each other. This is shown well for instance in FIG. 14 (i.e. the two lateral guide faces 213q of the two shown guide slots 213b face against each other).

FIG. 8 shows an enlarged portion of the perspective view of FIG. 1, showing in particular the forward and aft porch guiding members 113a, 113b in better detail. The forward porch guiding member 113a has a lateral guide face 113q, which is divided into two lateral guide faces, namely an inclined front lateral guide face 113q1 and an axial rear lateral guide face 113q3. The inclined front lateral guide face 113q1 is inclined with respect to the axial direction. The axial rear lateral guide face 113q3 extends vertically (without inclination) and in the axial direction. In this embodiment, the axial rear lateral guide face 113q3 merges with the inclined front lateral guide face 113q1. When the forward porch guiding member 113a enters into the void of the forward guide slot 213a, the inclined front lateral guide face 113q1 enters first. As the forward termination guide slot 213a moves forward, the aft porch guiding member 113b enters into the void of the aft termination guide slot 213b, the inclined front lateral guide face 113q1 enters first. This sequential arrangement of engagement between the porch guiding member guide faces and the termination guide slots results in a controlled engagement and gradual angle adjustment per horizontal movement (resulting from the stroke tool). This also reduces the frictional forces throughout the horizontal movement (resulting from the stroke tool).

In addition to the lateral guide faces of the forward porch guiding member 113a, it also has an upper guide face 113p, which is divided into an inclined front upper guide face 113p1, an axial intermediate upper guide face 113p2 and an inclined rear upper guide face 113p3. Correspondingly, it has an inclined front lower guide face 113r1, an axial intermediate lower guide face 113r2, and an inclined rear lower guide face 113r3.

The aft porch guiding member 113b is also provided with similar guide faces. In addition to what is provided on the forward porch guiding member 113a, the aft porch guiding member 113b is also provided with an intermediate lateral guide face 113q2, between the front and rear lateral guide faces.

The forward porch guiding members 113a are parts of the respective forward guiding arrangements A1, A2. Correspondingly, the aft porch guiding members 113b are parts of the respective aft guide arrangements B1, B2.

The inclined guide faces and the axial guide faces have a front portion 114a and an aft portion 114b, i.e. where they begin and end, respectively. For instance, the aft portion 114b of the inclined front upper guide face 113p1 interfaces with the front portion 114a of the axial intermediate upper guide face 113p2. Further reference to the front portions 114a and aft portions 114b of the guide faces will be given further below.

As will be appreciated by the skilled person, it will be possible to switch the position of the guide slots and the guide members, so that the termination part 200 is provided with the protruding guide members 113a, 113b, and the porch part are provided with the receiving guide slots 213a, 213b.

FIG. 9 to FIG. 12 depict four stages of movement of the termination part 200 with respect to the porch part 100, after landing. For illustrational purpose, only selected portions of the porch part 100 and the termination part 200 are shown. Each of these four figures includes a side view (topmost) and a top view (bottom).

FIG. 9 depicts the situation shown with the perspective view of FIG. 2a, i.e. directly after landing of the termination part 200 onto the porch part 100. In this position, none of the guide faces 213p, 213q, 213r are in contact with any of the porch guiding members 113. Hence, the guide arrangements A1, A2, B1, B2 have not yet been engaged or activated. The four termination landing guide faces 215a, 215b of the termination part 200 have interacted with the respective four porch landing guide faces 115a, 115b of the porch part 100, thereby providing a rough first alignment. During such landing, the engagement between the guide post 111 and guide element 211 also contributed to such first rough alignment.

By actuation of the stroke tool, the termination part 200 is pulled towards the connected position in a substantially axial direction. In the position shown in FIG. 10, the termination part 200 has been pulled a short distance towards the connected position. In this second stage, as shown with the top view of FIG. 10, the upper guide face 213p of the forward guide slot 213a has entered into contact with the inclined front upper guide face 113p1 of the forward porch guiding member 113a. This engagement will slightly lift the termination part 200 with respect to the porch part 100. Moreover, as shown with the lowermost view of FIG. 10 (which is a top view), the lateral guide face 213q of the forward guide slot 213a has entered into contact with the facing inclined front lateral guide face 113q1 of the forward porch guiding member 113a. This sliding abutment aligns the termination part 200 and the porch part 100 in a lateral direction. Thus, the engagement between the two forward porch guiding members 113a and the two forward guide slots 213, of the termination part 200, aligns in directions crosswise to the axial direction. Notably, in the position shown in FIG. 10, there is still no engagement between the aft guide slot 213b and the aft guiding member 113b. Thus still only the forward guide arrangements A1, A2 are engaged.

Notably, in the embodiment shown in FIG. 9 to FIG. 12, the inclined front guide faces of the forward guiding component 113a are longer and less steep than the inclined front guide faces of the aft guiding component 113b. Advantageously, the engagement of the forward guide slots 213a onto the forward inclined surfaces occurs first, in order to assist alignment of the aft guide slots 213b onto the aft inclined surface.

In the situation shown in FIG. 11 the termination part 200 has been pulled further towards the connection position. In this third stage, engagement between the aft porch guiding member 113b and the aft guide slot 213b has commenced. In this third stage, both the forward guide arrangements A1, A2, as well as the aft guide arrangements B1, B2, are engaged. That is, the forward termination guiding members of the guide slot 213a (with faces 213p, 213q, 213r indicated in FIG. 7) have reached the intermediate (axial) areas 113q2, 113p2 of the forward guiding members, and the aft termination guide faces have commenced climbing on the aft guiding members inclined front faces 113p1, 113q1, 113r1. While these engagements continue to align the position in directions crosswise to the axial direction, they also align the mutual angle between the porch part 100 and the termination part 200. If there is an angular misalignment between the porch part 100 and the termination part 200, and consequently then also between the two facing hubs 101a, 201a, the position aligning engagement at two axially separated positions will contribute in repairing such angular misalignment.

Such angular alignment, as well as alignment of position crosswise to the axial direction, may result in tension and moments in the tie-in spool 201. The forces between the guide faces of the guide arrangements will at this stage take these bending forces from the tie-in spool 201. To avoid excessive forces between the guide faces, such as for instance between the inclined front lateral guide face 113q1 of the aft porch guiding member 113b and the facing lateral guide face 213q of the aft guide slot 213b, it is advantageous to have a certain axial distance between the two sets of guide faces. This will reduce the contact forces and mitigate jamming. That is, it is advantageous that the forward guide arrangements A1, A2, comprising the two forward porch guiding members 113a and the two forward guide slots 213a, have an axial distance from the aft guide arrangements B1, B2, comprising the two aft porch guiding members 113b and the two aft guide slots 213b.

Still referring to FIG. 11, illustrating the third stage, the guide faces of the forward guide arrangements A1, A2 are now sliding on axial guide faces 113p2, 113q2, 113r2, while for the aft guide arrangements B1, B2 climbing has begun on the inclined guide face 113p1, 113q1. Notably, the "climbing" on the aft inclined surfaces continues for some distance after the "climbing" on the forward inclined faces have ended.

In FIG. 12, the fourth stage is depicted. In this position, the termination part 200 has been pulled further towards the connected position, until the hub guide faces engage and lift the forward guide slot 213a off the forward guiding member 113a.

Figure 13:
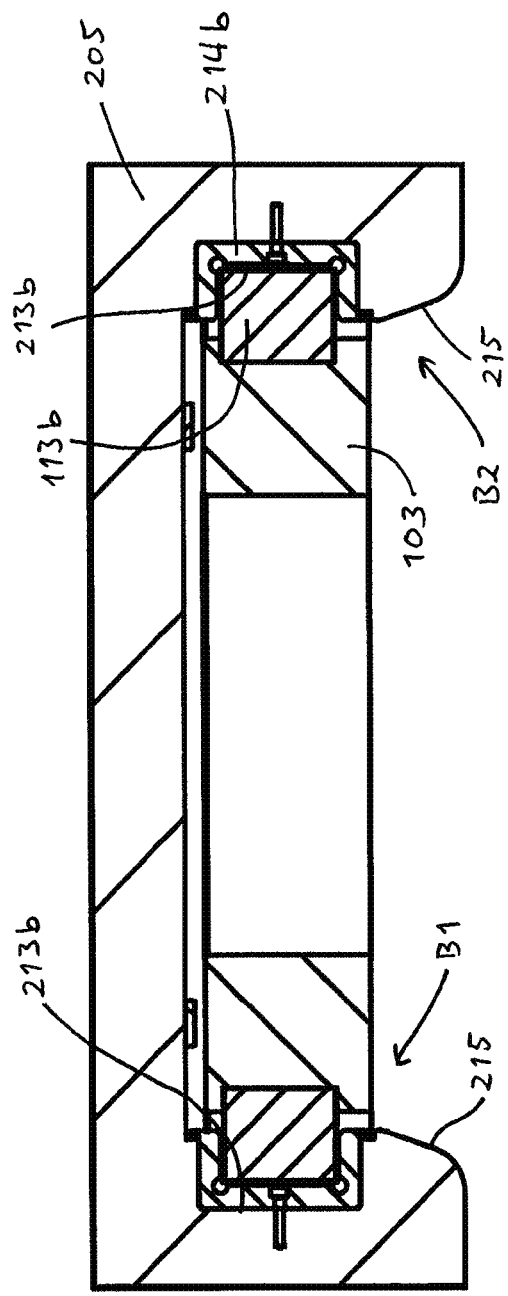
FIG. 13 and FIG. 14 depict principle illustrations of two different embodiments of details of the system according to the invention.
Figure 14:
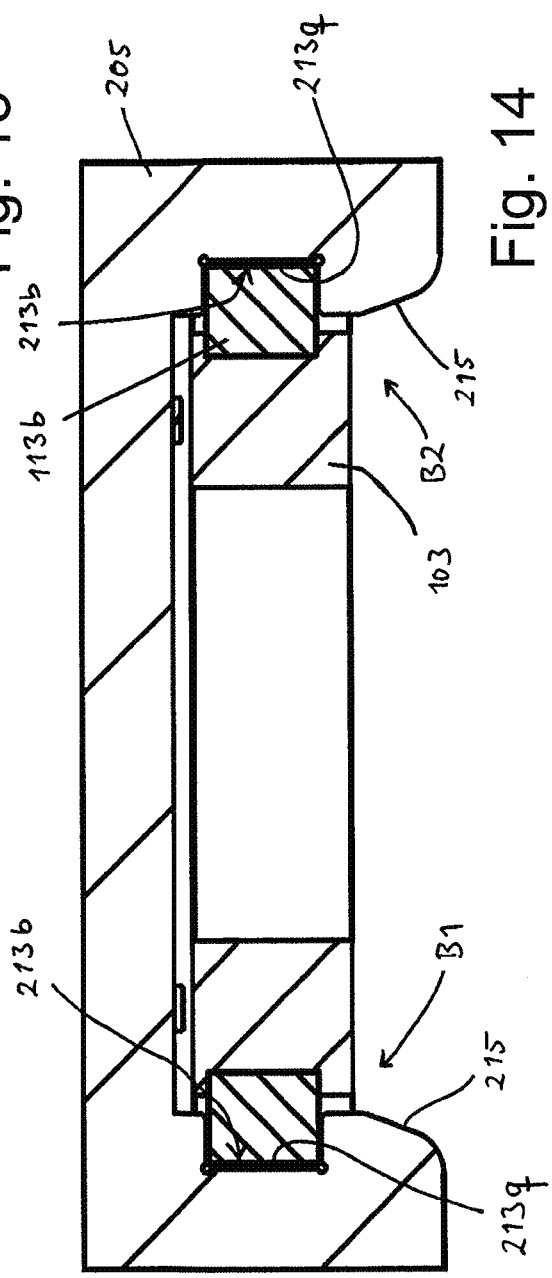

FIG. 13 and FIG. 14 show a part of the main plate 205 of the termination part 200, provided with the aft guide slots 213b of the aft set of guide faces. Also shown is the base plate 103 of the porch part 100, and the aft porch guiding members 113b attached to it. Thus, the two aft guide arrangements B1, B2 are shown. In the shown position, the aft porch guiding members 113b are arranged within the aft guide slots 213b.

In the embodiment shown in FIG. 13, the aft guide slots 213b are provided with machined inserts 214. Such inserts may be attached to the main plate 205 by bolts. By using machined inserts 214 in the guide slots 213a, 213b, one may produce the main plate 205 and/or the auxiliary plates 206 with only one processing round in the machining unit (i.e. by rigging the base plate 103 only one single time for machining). The machined inserts 214 may then be manufactured with more narrow tolerances based on in situ measurements, to obtain the required alignment.

FIG. 15a and FIG. 16 are a side view and a top view of the tie-in system according to the invention, shown in the connected state. For illustrational purpose, some components, such as the connector 300, are made transparent. At the end of the pipeline 101 there is the porch hub 101a. Correspondingly, at the end of the tie-in spool 201, there is the tie-in termination hub 201a. The two hubs 101a, 201a are shown in the mated, connected position. FIG. 15b is a cross section side view of the tie-in system in a connected state.

In FIG. 15a, three black dots have been added for illustration, and to explain some principal, technical features of the invention. The dot arranged at the bottom, left hand side represents the position of the engagement between the contact faces of the forward guide arrangements A1, A2, comprising the two forward porch guiding members 113a and the two forward guide slots 213a. This position of said engagement is a forward axial position 1. According to this embodiment, there are two forward axial positions 1, namely one on each respective side of the termination part 200. The dot arranged at the bottom, right hand side represents the position of engagement between the contact faces of the aft guide arrangements B1, B2, comprising the two aft porch guiding members 113b and the two aft guide slots 213b. This position is named an aft axial position 2. The third dot in FIG. 15, centrally arranged above the first two, is arranged at the central position where the porch hub 101a and the tie-in termination hub 201a meet. This position is herein termed a central hub position 3.

Still referring to the side view of FIG. 15d, which shows the situation when the facing hubs 101a, 201a, partially engage into each other (male hub enters the female hub). The dotted lines are thus included in order to illustrate the mutual position of the forward axial position 1, the aft axial position 2, and the central hub position 3. Notably, the central hub position is arranged on the axially extending, central axis that extends through the two hubs 101a, 201a. Moreover, the triangle defined by the forward axial position 1, the aft axial position 2 and the central hub position 3, is advantageously an isosceles triangle, when viewed with the side view of FIG. 15d. Notably, a vertical center line through the central hub position 3 extends centrally between the forward and aft axial positions 1, 2. The situation after completed stroking of the hubs (i.e. moving the male hub into the female hub in this embodiment), with subsequent full engagement of the two hubs, is shown with the cross section side view of FIG. 15b.

The hub-to-hub engagement is illustrated in FIG. 15a and FIG. 15b. The position of the porch hub 101a and termination hub 201a just before the male hub (which in this embodiment is the termination hub 201a) enters into the female hub is shown in FIG. 15c and FIG. 15d. The female/male hub spacing at this stage equals approximately half the entering depth of the male hub into the female hub, see section view FIG. 15c. The physical contact in position 1 has now ceased, and only position 2 and position 3 are active when the making up of the connector commences.

FIG. 15a depicts the situation upon completed stroking of the hubs 101a, 201a, just before the connector 300 make up starts. During the closing action of the connector 300, the guide faces of the termination part at the aft guiding arrangement B1, B2, i.e. the aft guide slots 213b, as well as the guide faces at the forward guide arrangement, A1, A2, are free to lift off the contact with the aft/forward porch guiding members 113b.

The final making up of the two hubs 101a, 201a, performed by the connector 300, continues until a correct pretensioning of the connector is achieved.

Notably, the distance moved by the termination part 200 with respect to the porch part 100, in the axial (here: horizontal) direction, is less than the axial distance between the forward and aft guide arrangements. As a result, the guide arrangements may take up relatively large bending moments, stemming from the termination misalignment prior to engagement on the porch part 100 and the tie-in spool 201 stiffness, with moderate contact forces between the guide faces. The short distance moved will also contribute to less bending forces, as the tie-in spool 101 will be elastically less deformed than it would have been with a longer distance.

Referring now to the top view of FIG. 16, the central hub position 3 is indicated, as well as the forward axial position 1 and the aft axial position 2. With this top view, two forward guiding arrangements A1, A2 are shown at the forward axial position 1, while two aft guide arrangements B1, B2 are shown at the aft axial position 2. Notably, the triangle formed by the forward and aft axial positions 1, 2 that are on the same lateral side of the porch part 200, and the central hub position 3, forms an isosceles triangle also in this top view. Moreover, as shown with the dotted lines, one forward guide arrangement A1 (or A2) and one laterally oppositely arranged aft guide arrangement B2 (or B1) are arranged on directly opposite sides of the position of the central hub position 3. Hence, the illustrational, straight dotted lines extending between such opposite forward and aft guide arrangements, extend through the central hub position 3.

A result of the mutual positions of the four guide arrangements A1, A2, B1, B2 and the central hub position 3, is that during angular alignment of the two hubs 101a, 201a, the relative pivoting movement between the two hubs will occur about the central hub position 3. This is advantageous since the abutting faces of the respective hubs 101a, 201a will be less exposed to mutual offset against each other. In other solutions, where for instance the termination hub 201a would be angularly aligned about a point axially further back on the tie-in spool 201, angular alignment would result in positional, offset movement between the two hubs. A limited offset of the hubs will maximize the tie-in system's capacity to complete the tie-in operation when subjected to high bending moments. The resulting hub-hub-offset is a sum of the contribution from machining tolerances, pre-defined sliding clearances and structural deflection due to moments and forces. The main object is to limit the offset to less than the hub system catching capability.

As is also well shown in the top view of FIG. 16, the laterally outermost extending parts of the porch part 100 extends significantly less out than the parts of the termination part 200. In this embodiment, the laterally outermost parts of the porch part 100 is constituted by the porch guiding members 113a, 113b, except for two structures of the base plate 103 configured to support or engage with a guide post. In this embodiment, these two structures extend somewhat laterally beyond the porch guiding members. Still, however, this design makes it possible to obtain a relatively slim porch part 100. This is advantageous for instance when laying the pipeline 101, such as from a pipe-laying barge or ship. In particular, such a narrow design makes it more convenient to pass the porch part 100 through pipe-laying equipment on the surface, typically including welding and coating equipment.

Notably, the guide faces on the porch part 100, such as the inclined front upper guide face 113p1, the axial intermediate upper guide face 113p2, inclined rear upper guide face 113p3, inclined front lateral guide face 113q1 and so on, are all facing either upwards, downwards, or laterally out from the porch part 100. In other words, there are no guide faces on the porch part 100, which is part of the alignment system that faces inwards, towards the porch part 100. This is contrary to the initially discussed guide pin and guide bore solutions of the prior art.

Figure 17:
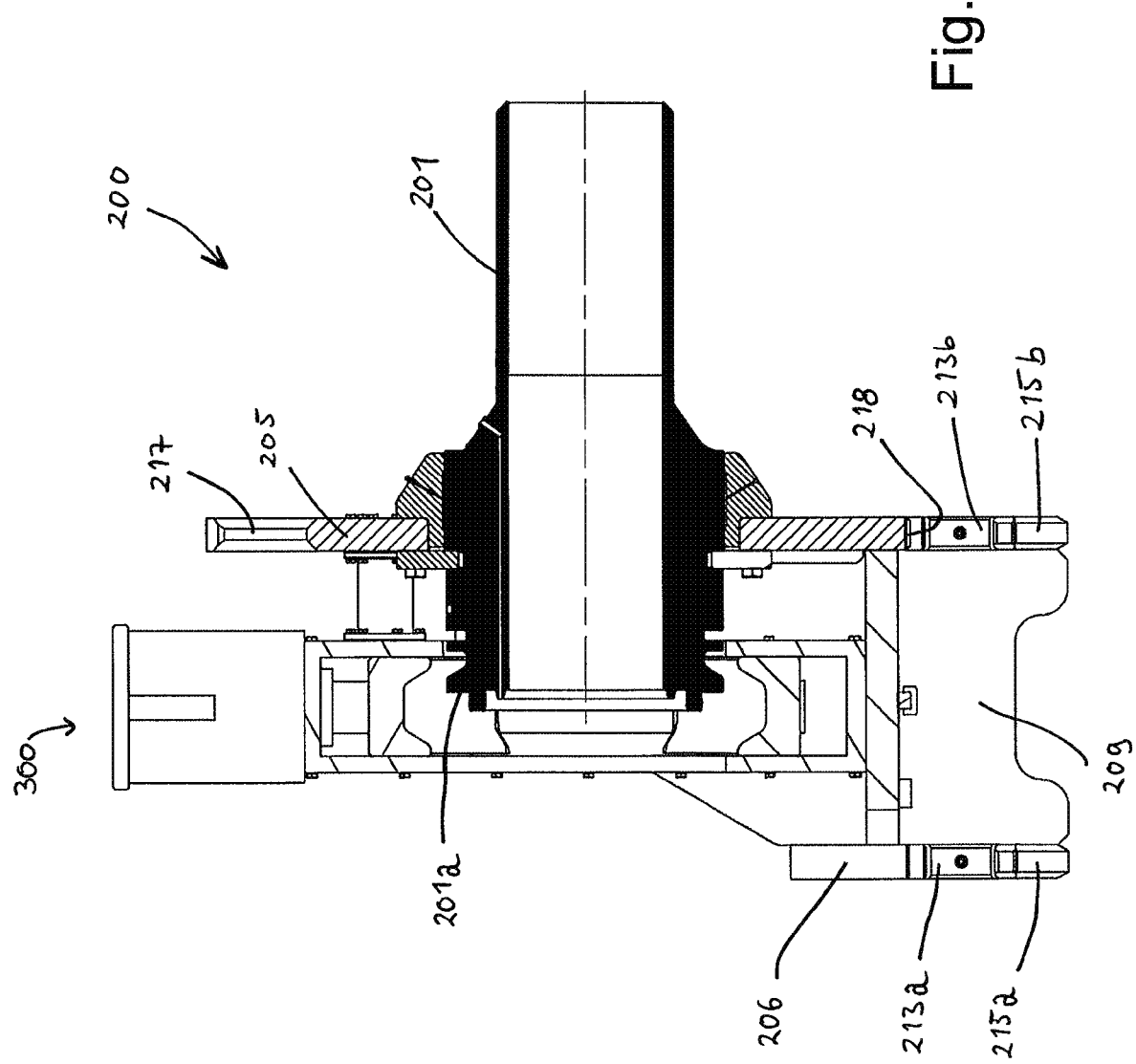
FIG. 17 is a cross section side view through the termination part and connector, along the center axis of the termination hub.

FIG. 17 is a cross section side view through the connector 300 and the termination part 200, along a vertical plane extending through the center axis of the termination hub 201a.

Figure 18:
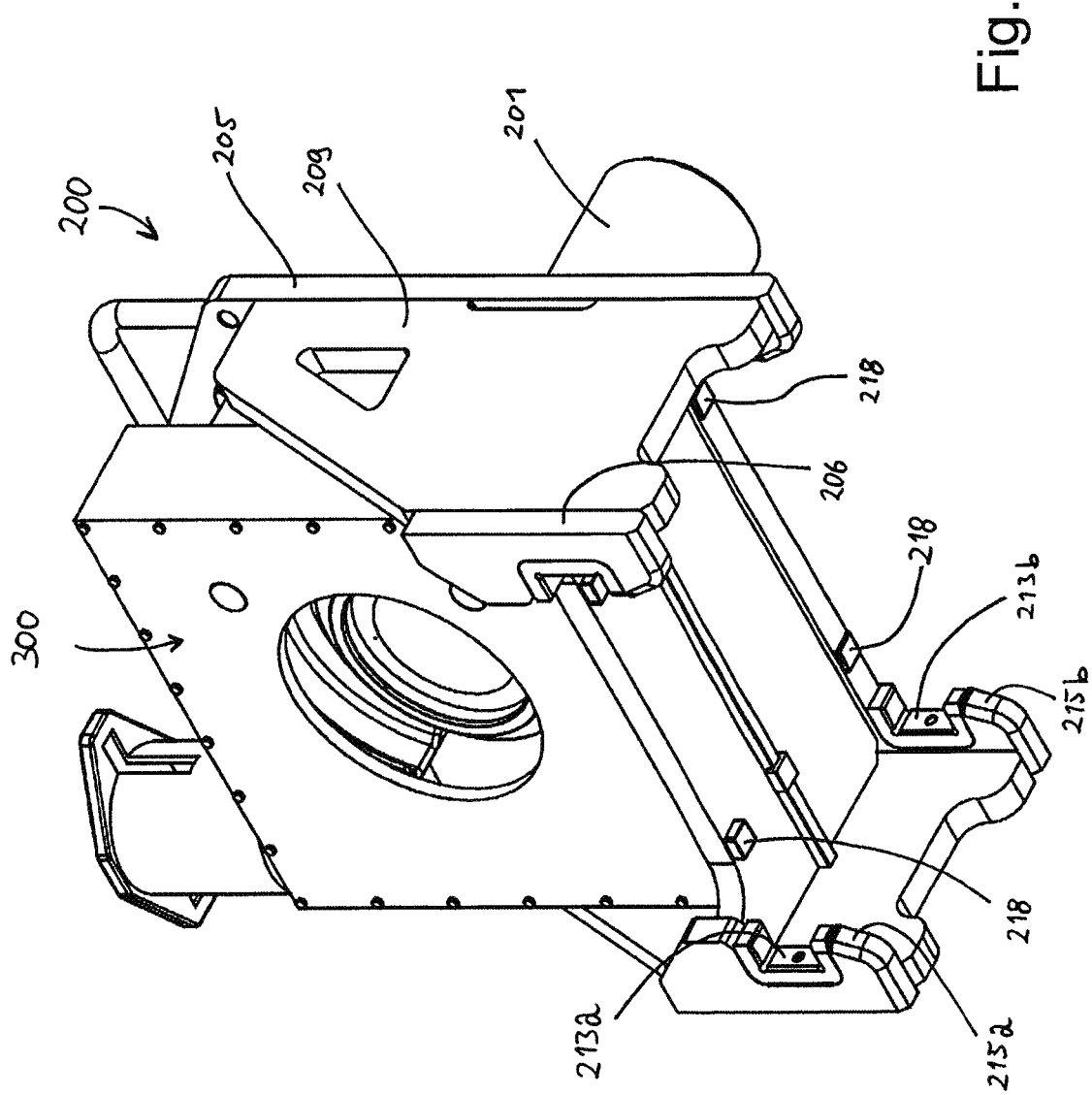
FIG. 18 is a perspective view showing the termination part from below.

FIG. 18 is a perspective view of the termination part 200, seen from below. In this view one can see the termination landing surface 218 on spacers attached to the lower side of the termination part 200. The termination landing surfaces 218 are configured to land on the base plate 103 and will be dimensioned so that the guide slot 213a, 213b will correctly engage the guiding members 113a, 113b when the horizontal movement occurs.

Figure 19:
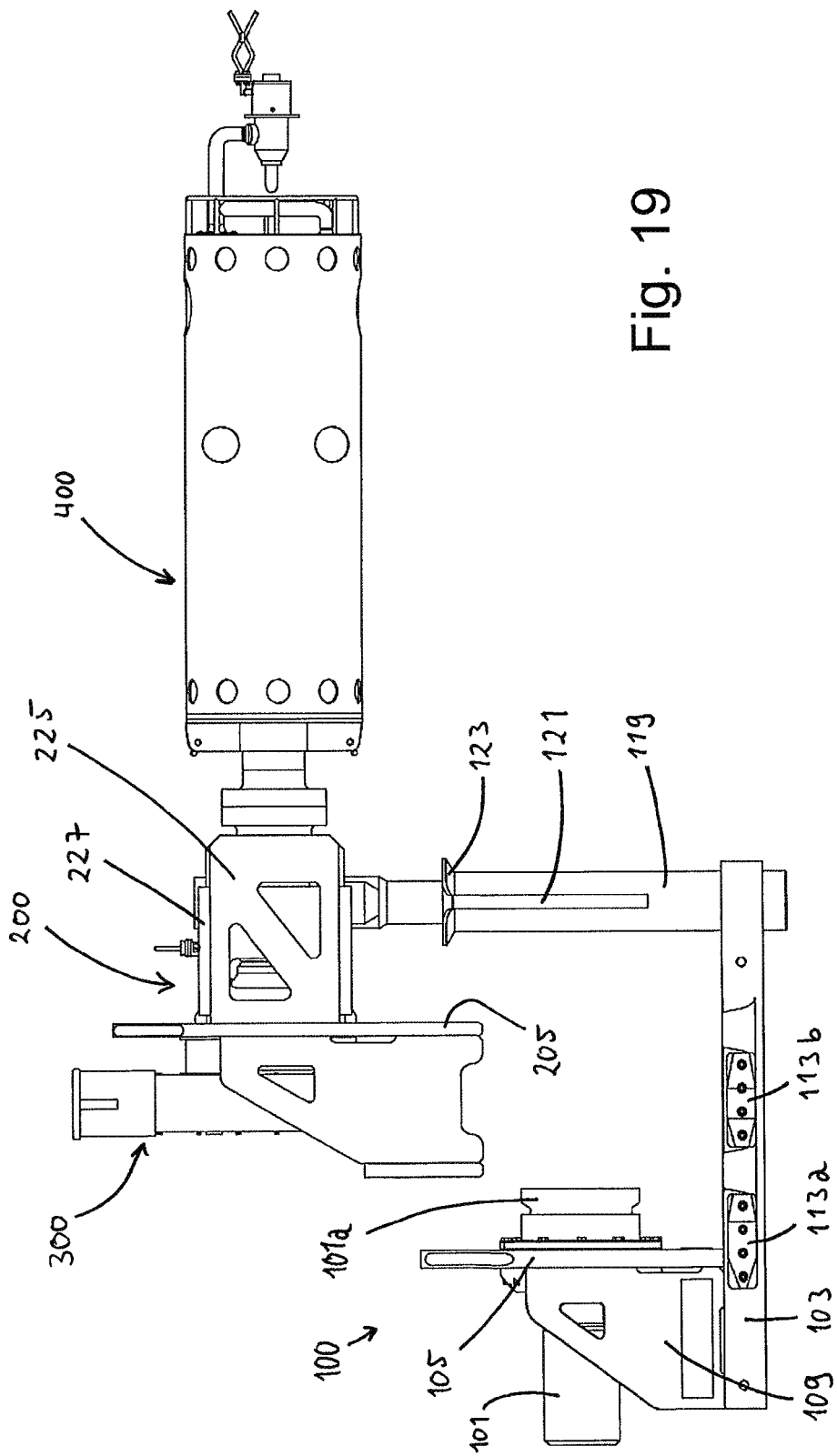
FIG. 19 is a side view of an alternative embodiment, wherein the system according to the invention is used for tying in a pig launcher/pig receiver.

FIG. 19 is a side view of a subsea horizontal pig launcher/pig receiver tie-in system according to some embodiments of the present invention. As the skilled person will appreciate, the described embodiment has several components that are common with the embodiment discussed with reference to FIG. 1 to FIG. 18, including the main structure of the porch part 100 and the connector 300. Moreover, although the system shown in this embodiment is adapted for tie-in of a pig launcher/pig receiver, a corresponding system may be used for tie-in of a pressure cap, a laydown head, or other "heavy" object.

In the embodiment shown in FIG. 19, reference number 200 is used for a pig launcher/pig receiver termination part, which is a modified termination part, compared to the one discussed above with reference to FIG. 1 to FIG. 18. The alignment system, comprising the two forward and two aft guide arrangements A1, A2, B1, B2 are the same as discussed above, and will not be discussed further.

In this embodiment, the pig launcher/pig receiver termination part 200 is connected to a pig launcher/pig receiver unit 400 (pig launcher receiver), configured to insert a pig from or receive a pig from the pipeline 101. The pig launcher/pig receiver termination part 200 is configured to land on the porch part 100, and the termination hub 201a (not shown) is configured to be connected to the porch hub 101a with the connector 300, as discussed above. In this manner, access from the pig launcher/pig receiver 400 to the subsea pipeline (not shown) is provided, through the two facing hubs 101a, 201a. The function of the pig launcher/pig receiver and its connection to the termination part 200 will not be discussed herein.

The situation shown in FIG. 19, wherein the pig launcher/pig receiver termination unit 200 is about to be landed onto the porch part 100 is also shown with the perspective view of FIG. 20. In the situation shown in FIG. 21, the pig launcher/pig receiver termination unit 200 has landed and the hubs 101a, 201a have been aligned and connected by using a stroke tool (not shown) and the connector 300.

Extending up from the base plate 103 in this embodiment are two moment absorbing guide means, here in the form of vertically extending stab receptacles 119. In this embodiment, the stab receptacles 119 are hollow cylinders provided with a slit 121 and an entry cone 123. The stab receptacles 119 are advantageously subsea removable/re-installable. Hence, if a spool tie-in is to be performed after removal of the pig launcher/pig receiver then stab receptacles can be removed and replaced with one or two standard guide posts.

Connected to the main plate 205 and extending rearwards are two vertically arranged guide plates 225. The guide plates 225 have upper and lower edges that both extends parallel with respect to the axial center line of the termination hub 201a. The guide plates 225 form part of an axial sliding arrangement. Moreover, the two guide plates 225 extend into respective guide slots or guide rails 227, which are also part of the axial sliding arrangement.

The guide rails 227 are fixed to a respective guide means engagement arrangement, here in the form of sliding guide stabs 229 (FIG. 20). The sliding guide stabs 229 are configured to enter into the stab receptacles 119 when the pig launcher/pig receiver termination part 200 lands, thereby providing alignment. The slits 121 in the stab receptacles 119 allow a mechanical fixed connection to extend between the guide rails 227 and the sliding guide stabs 229.

As appears from the side view of FIG. 22, inter alia, the weight of the pig launcher/pig receiver unit 400 will exert a bending moment to the pig launcher/pig receiver termination unit 200. The engagement between the guide rails 227 and the guide plates 225 will contribute in withstanding this moment, as the sliding guide stabs 229 are supported in the stab receptacles 119. FIG. 22 depicts the system in a landed, but not yet connected mode.

Figure 23:
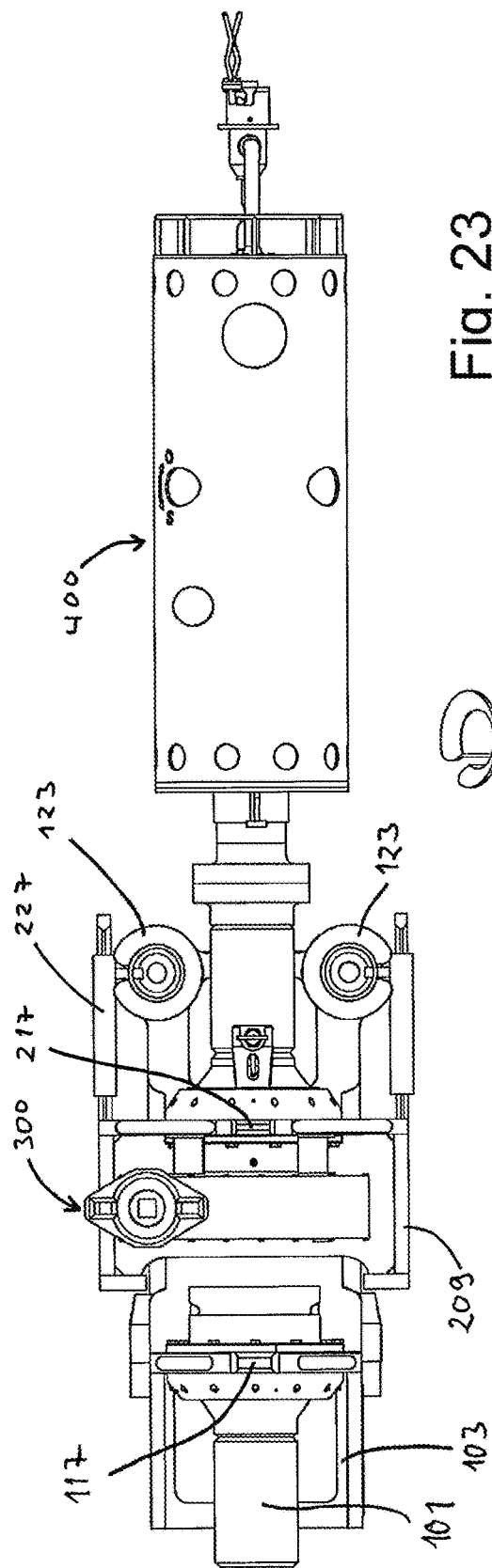
FIG. 23 is a top view of the system shown in FIG. 19, after landing but before connection.
Figure 24:
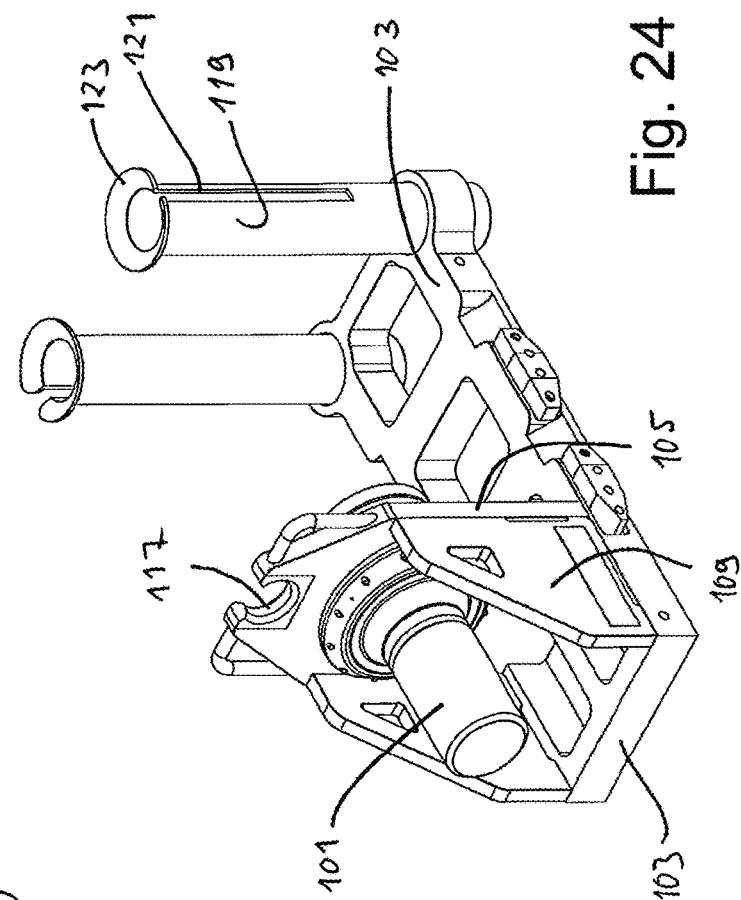
FIG. 24 is a perspective view of the porch part of the system shown in FIG. 19.
Figure 25:
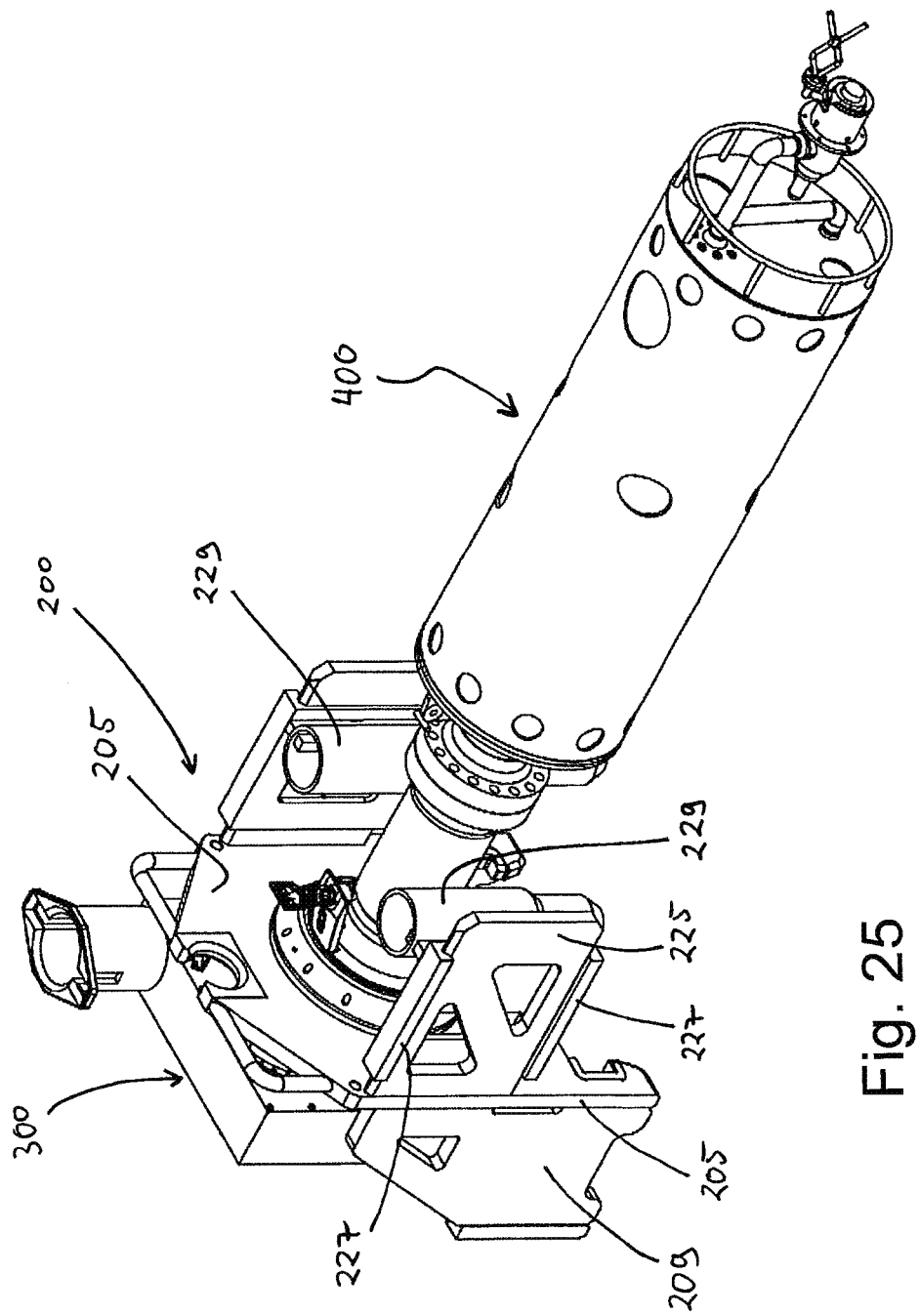
FIG. 25 is a perspective view of the termination part of the system shown in FIG. 19.

FIG. 23 is a top view showing the system in a landed mode. FIG. 24 and FIG. 25 are perspective views of the porch part 100 and the pig launcher/pig receiver termination part 200 in separate views.

Figure 27:
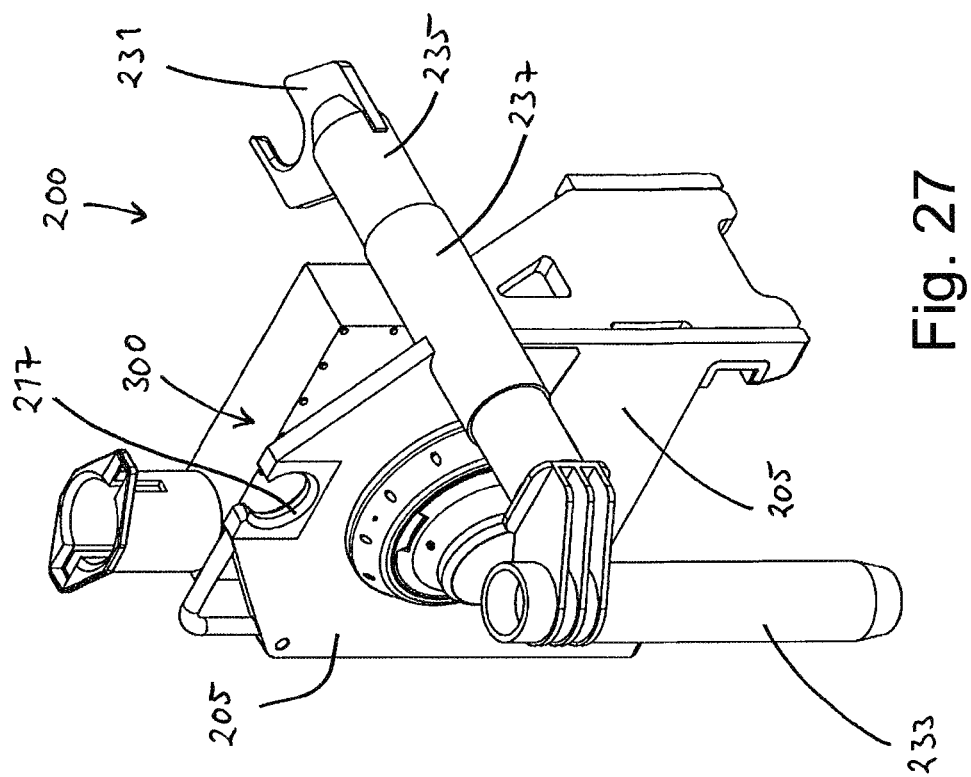
FIG. 27 is a perspective view of the termination part of a system configured for tie-in of a flexible hose.
Figure 26:
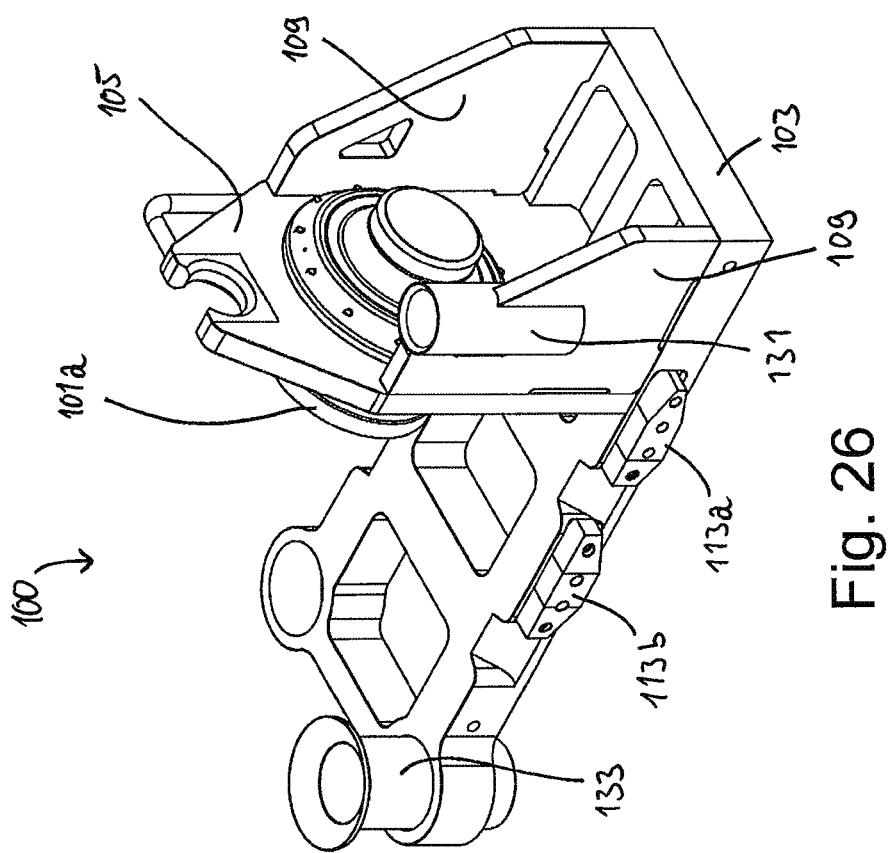
FIG. 26 is a perspective view of the porch part of a system configured for tie-in of a flexible hose.

An embodiment of a subsea horizontal flexible flowline tie-in system is depicted in FIG. 26 and FIG. 27. When lowering the termination part 200, when attached to the end of a flexible flowline, it may be difficult to land the termination part onto the porch part 100. The subsea horizontal flexible flowline tie-in system discussed below addresses the object of guiding the termination part correctly onto the porch part. In the following example, the flexible flowline, which connects to the termination part 200, is not included in the drawings. The subsea pipeline connected to the porch part 100 is neither shown in the drawings.

FIG. 26 is a perspective view of a porch part 100, substantially corresponding to the porch part 100 discussed with reference to FIG. 1. A difference is however that the porch part 100 shown in FIG. 26 is provided with a first guide post receptacle 131, which is arranged on the pipeline side of the pipeline hub 101a, i.e. closer to the porch hub 101a than to the termination hub 201a, when the latter is landed and connected. In this particular embodiment, the guide post receptacle 131 is fixed to the support plate 109, which is fixed to the base plate 103 and the connection plate 105. The porch part 100 further comprises a second guide post receptacle 133, which is arranged on the termination side of the pipeline hub 101a, i.e. closer to the termination hub 201a than to the porch hub 101a, when the termination hub is landed and connected. The first and second guide post receptacles 131, 133 are configured to receive a vertically extending guide post.

FIG. 27 is a perspective view of a termination part 200, which exhibits many features in common with the termination part 200 discussed with reference to FIG. 1 above. Furthermore, the termination part 200 comprises a first alignment means 231 and a second alignment means 233. In this embodiment, the first alignment means is in form of a guide fork 231, which is configured to enter into engagement with a guidepost 131a (cf. FIG. 28 and FIG. 29) extending up from the first guide post receptacle 131. The second alignment means is in form of a guide post 233 configured to enter into the second guide post receptacle 133 in the porch part 100.

The first and second alignment means 231, 233 on the termination part 200 are connected to each other with a sliding cylinder 235. The sliding cylinder 235 is supported in a support sleeve 237 in such manner that the sliding cylinder 235 can slide in an axial direction within the support sleeve 237. The support sleeve 237 is fixed to the termination part 200. In this embodiment, the support sleeve 237 is welded to the main plate 205 of the termination part.

Figure 28:
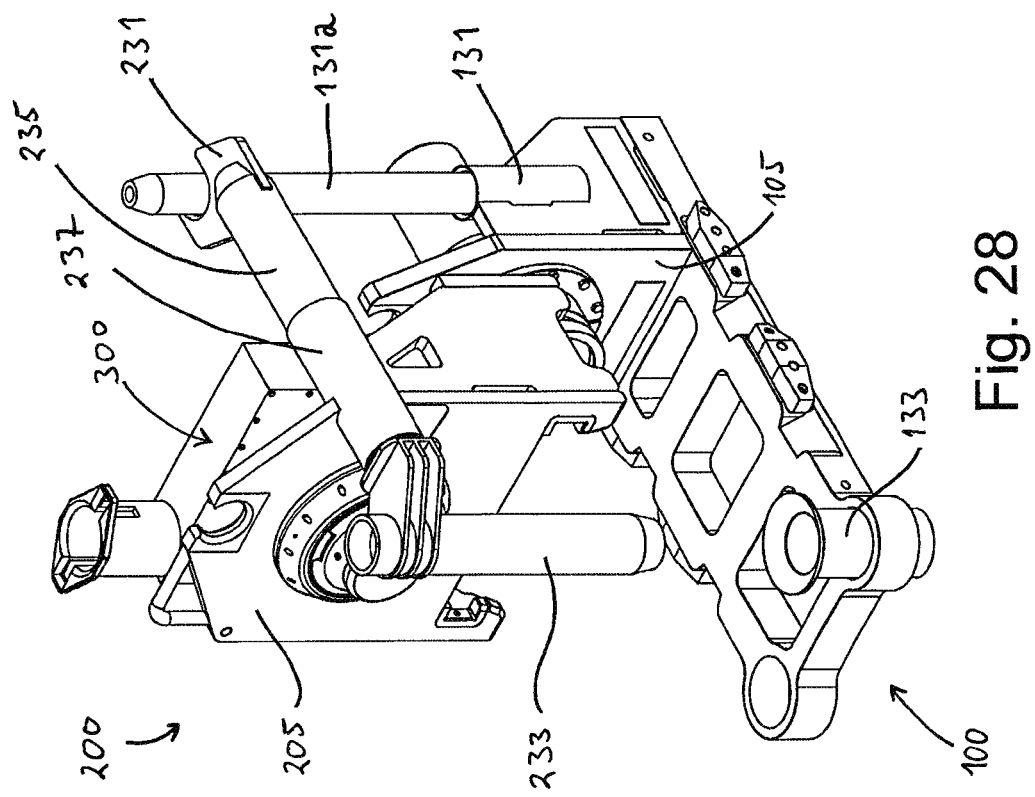
FIG. 28 is a perspective view of the system shown in FIG. 26 and FIG. 27, just before landing of the termination part.

In the situation shown in FIG. 28, the termination part 200 is about to be landed onto the porch part 100. A guidepost 131a has already been mounted in the first guidepost receptacle 131 in the porch part 100. The first alignment means of the termination part, namely the guide fork 231 engages the guidepost 131a during the lowering of the termination part 200.

Figure 29:
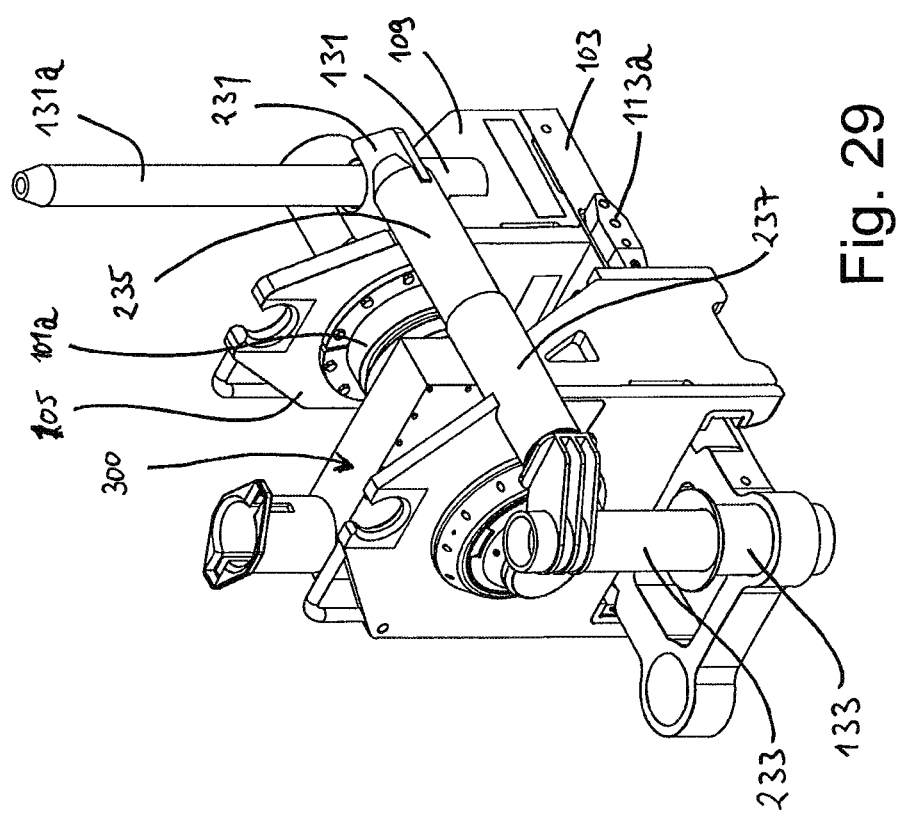
FIG. 29 is a perspective view of the system shown in FIG. 28, after landing but before connection.

FIG. 29 depicts the situation where the termination part 200 has landed on the porch part 100. The second alignment means of the termination part 200, namely the guide post 233, has been inserted into the second guide post receptacle 133 of the porch part 100.

As will be appreciated after the discussion of the embodiment according to FIG. 1, the termination part 200 is configured to be moved in a substantially horizontal direction in order to connect the facing hubs 101a, 201a of the porch part 100 and the termination part 200. During this movement, the sliding cylinder 235 will slide within the support sleeve 237. Notably, the first and second alignment means 231, 233 will not prevent vertical movement of the termination part 200 with respect to the porch part 100.

In the situation shown in FIG. 30, the termination part 200 has been moved substantially horizontally, such as by means of a stroke tool (not shown), and the connector 300 has made up the hub connection.

FIG. 31 to FIG. 42 depict another embodiment of the present invention. In this embodiment, most of the components of the termination part 200 correspond to the ones shown in FIG. 1. The embodiment disclosed in FIG. 31 to FIG. 42 will typically be suitable for the end of a flexible jumper or flowline. Thus, where it is referred to a tie-in spool 201, it shall be understood that the tie-in spool can be replaced with the end of a flexible jumper, a flowline, or the like.

Figure 34:
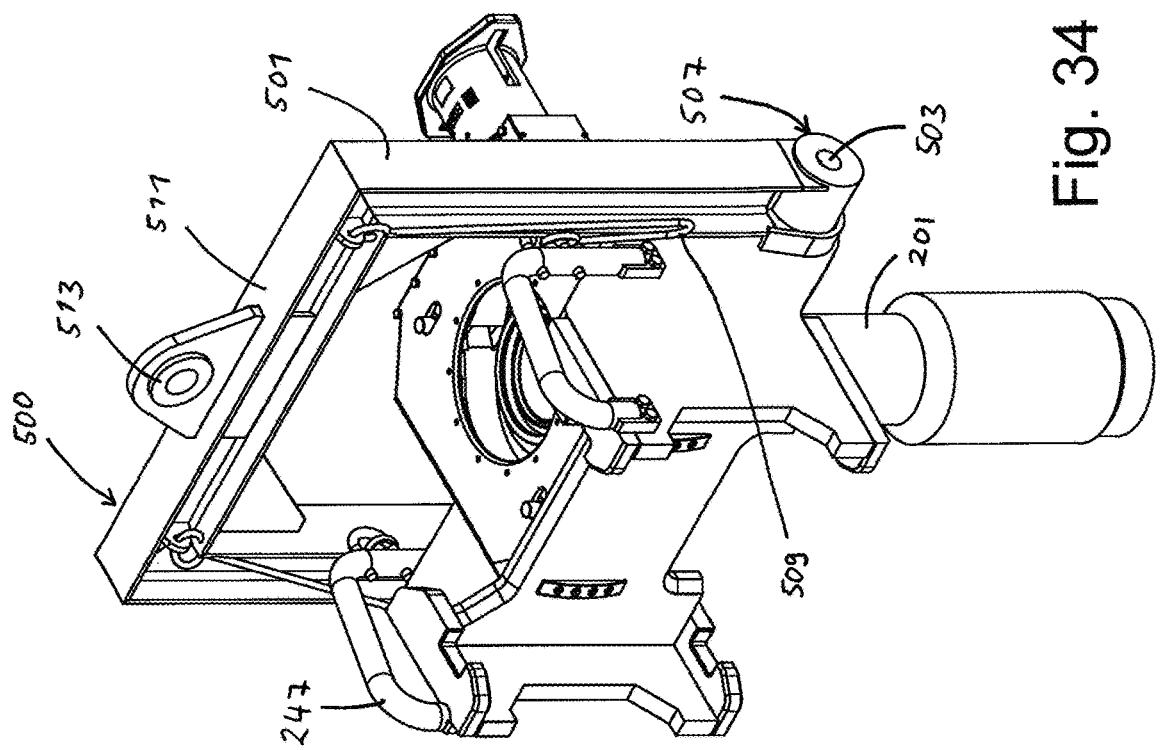
FIG. 34 is another perspective view of the items shown in FIG. 33, however in another state.
Figure 33:
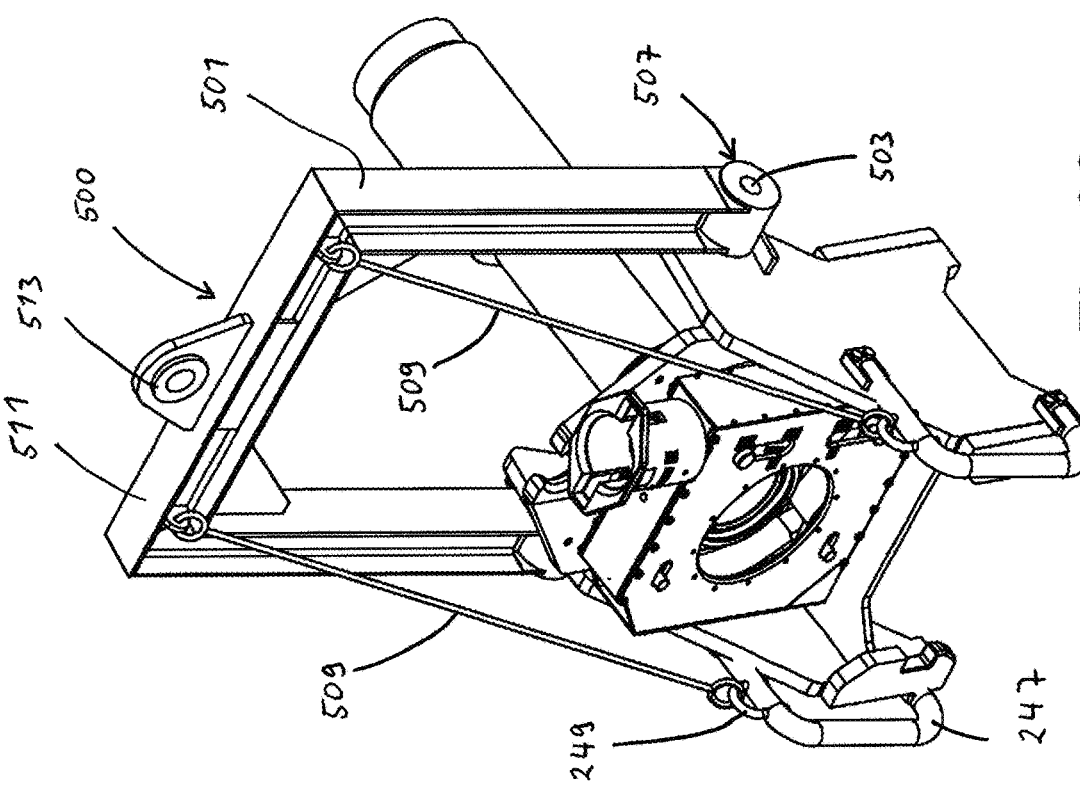
FIG. 33 is a perspective view of the termination part shown in FIG. 31, connected to a yoke.

In the perspective views of FIG. 33 and FIG. 34, the termination part 200 is shown with a yoke 500 connected to it. The yoke 500 has a rigid frame 501 that is pivotably fixed to the termination part 200 with a pair of sliding trunnions 503.

The sliding trunnions 503 are cylindrically shaped elements that are configured to slide into and extend through a bore of a hinge 507 at two lower ends of the rigid frame 501. The sliding trunnions 503 extend through the bore of the hinge 507 and further into respective trunnion anchor sleeves 241 that are arranged to the two aft plates 209 of the termination part 200. The trunnion anchor sleeves 241 are arranged in alignment with a trunnion receiving bore 243 in the aft plates 209. This is perhaps best shown in FIG. 31 and FIG. 32.

The sliding trunnions 503 can be removed after landing of the termination part 200 onto the porch part 100. In a situation where the operator wants to retrieve the termination part 200, the trunnions 503 can also be inserted in a subsea position, such as with an ROV. In such a scenario, the yoke 500 can be connected to the termination part 200 subsea, so that the termination part 200 can be lifted out of engagement with the porch part 100.

To facilitate mounting of the yoke 500 to the termination part 200, the termination part 200 is provided with two guiding cradles 245 arranged on the outwardly facing faces of the two aft plates 209.

The termination part 200 further comprises two bumper bars 247 that are fixed to the respective aft plates 209. At their upper portion, the bumper bars 247 comprise a respective pad eye 249.

As appears from FIG. 33, two yoke tension wires 509 are extended between an upper portion, such as the upper beam 511, of the yoke 500, and the pad eyes 249 on the termination part 200.

When the termination part 200 is lifted with the yoke 500, such as with a lifting wire connected to a lifting interface 513 arranged to the upper beam 511 of the yoke, the termination part 200 can pivot about the hinges 507, with respect to the yoke 500.

This appears by comparison between the positions of the termination part 200 shown in FIG. 33 and FIG. 34. In FIG. 33, the termination part 200 is shown in a substantially horizontal orientation. In this state, the yoke tension wires 509 are tensioned to retain the termination part 200 in its shown position. In the state shown in FIG. 34, however, the tie-in spool 201, or a corresponding part, such as a flexible jumper or a flexible flowline end, has a substantially vertical orientation, extending downwards from the termination part 200. In this state, the yoke tension wires 509 are not tensioned and are thus not affecting the orientation of the termination part 200.

Figure 35:
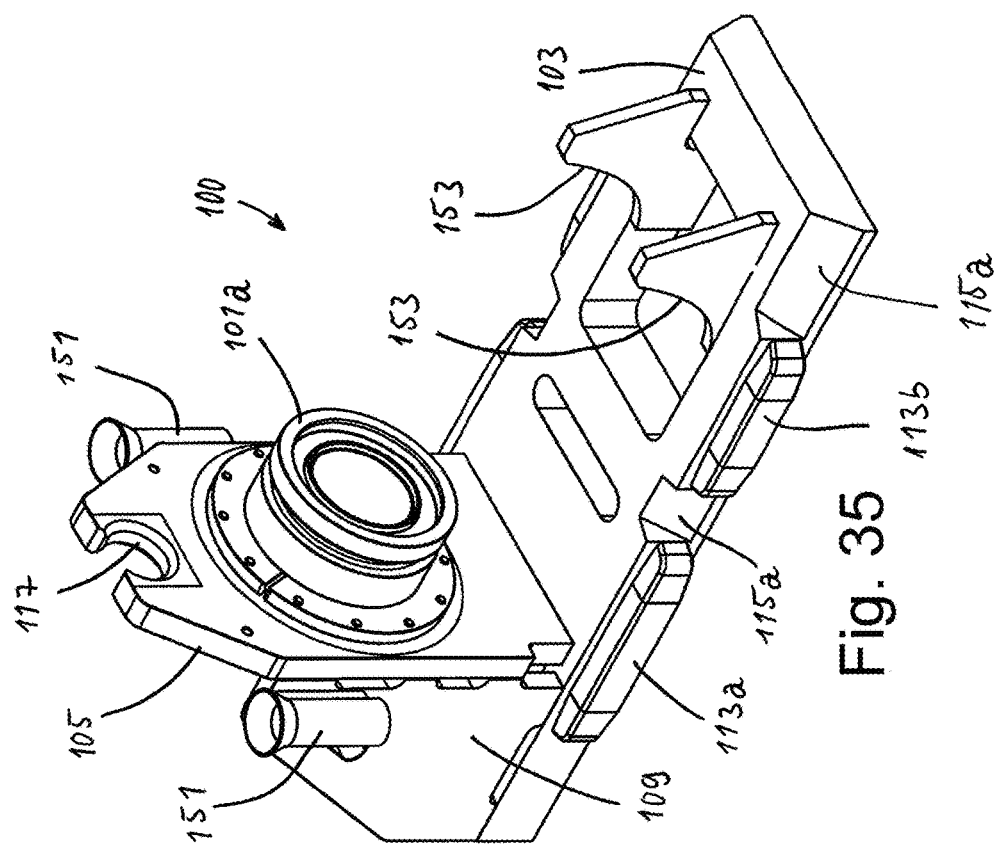
FIG. 35 is a perspective view of an alternative embodiment of the porch part.

Before the landing of the termination part 200 shown in FIG. 31 to FIG. 34 is discussed further below, reference is now made to FIG. 35 to FIG. 37, where a porch part 100 and a guide frame 600 is shown. As with the termination part 200 shown in FIG. 31 to FIG. 34, the porch part corresponds in many respects to the porch part shown in FIG. 1.

To each of the two support plates 109 there is fixed a vertically oriented guide post receptacle 151. Furthermore, to the base plate 103 there is arranged two upwardly extending porch guide profiles 153. The guide post receptacles 151 are configured to guide and receive the guide frame 600.

Figure 36:
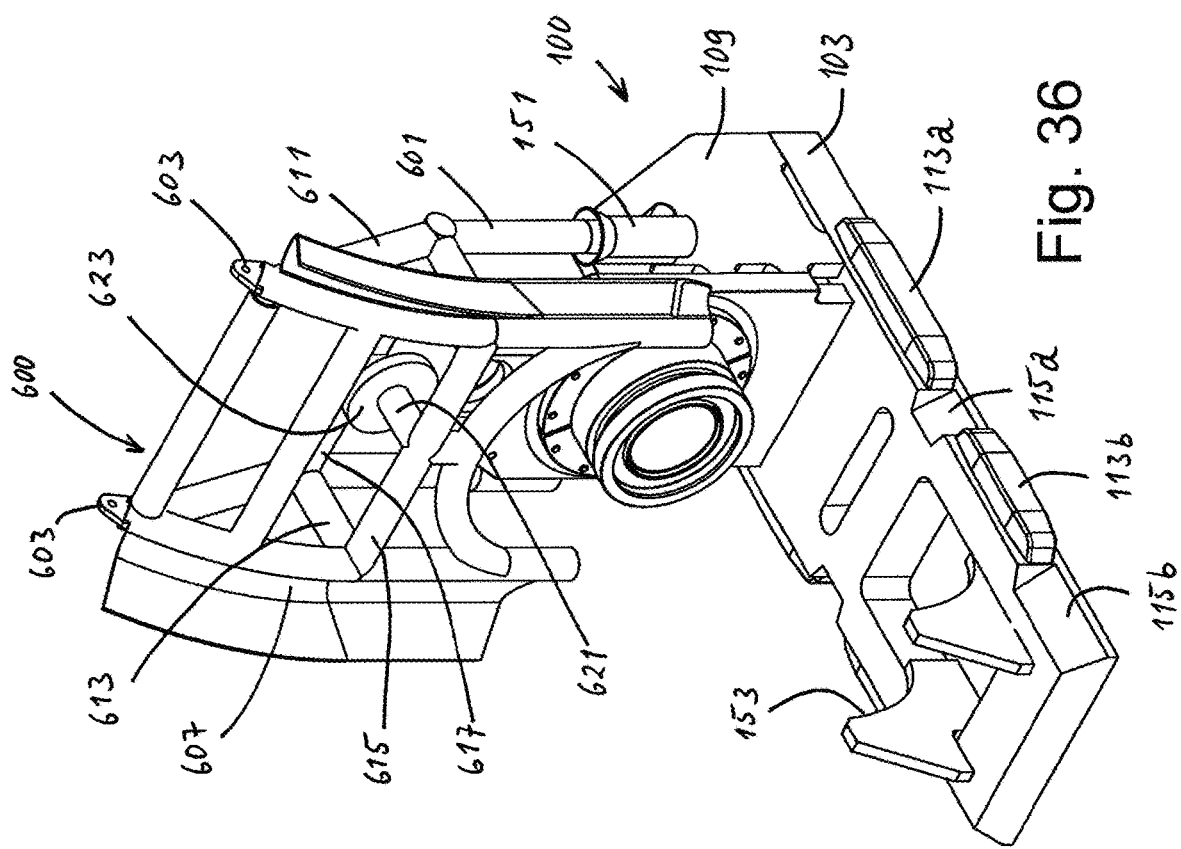
FIG. 36 is a perspective view of the porch part shown in FIG. 35, however with a guide frame that is about to be installed on the porch part.

In the perspective view of FIG. 36, the guide frame 600 is shown in a position where it is about to be installed on the porch part 100. The guide frame 600 comprises two guide frame pins 601, which in the shown position have been inserted into a respective guide post receptacle 151 on the porch part 100.

The guide frame 600 comprises two lifting eyes 603 at an upper portion, for lifting the guide frame down onto the porch part 100 or for retrieving the guide frame 600 from the porch part.

When landing the guide frame 600 onto the porch part 100, in addition to the engagement between the guide frame pins 601 and the guide post receptacles 151, there is provided an engagement between a guide frame landing support 605 and the stroke tool interface 117 of the porch part 100. That is, when lowered onto the porch part 100, the guide frame landing support 605 will eventually enter into engagement with the stroke tool interface 117 and thereby halt the downward landing movement of the guide frame 600. When in this landed position, there is thus an engagement between the two guide frame pins 601 and the guide post receptacles 151, as well as between the guide frame landing support 605 and the stroke tool interface 117.

Figure 37:
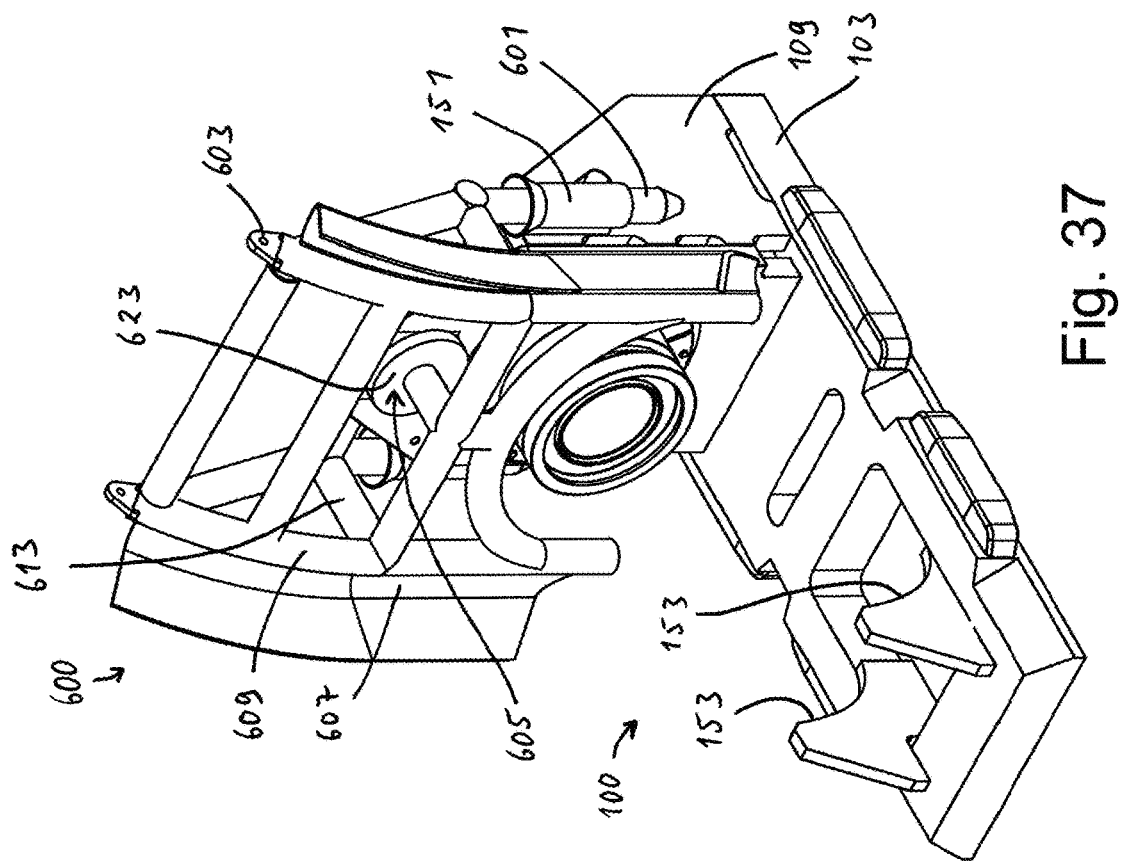
FIG. 37 is a perspective view of the components shown in FIG. 36, however with the guide frame installed on the porch part.
Figure 40:
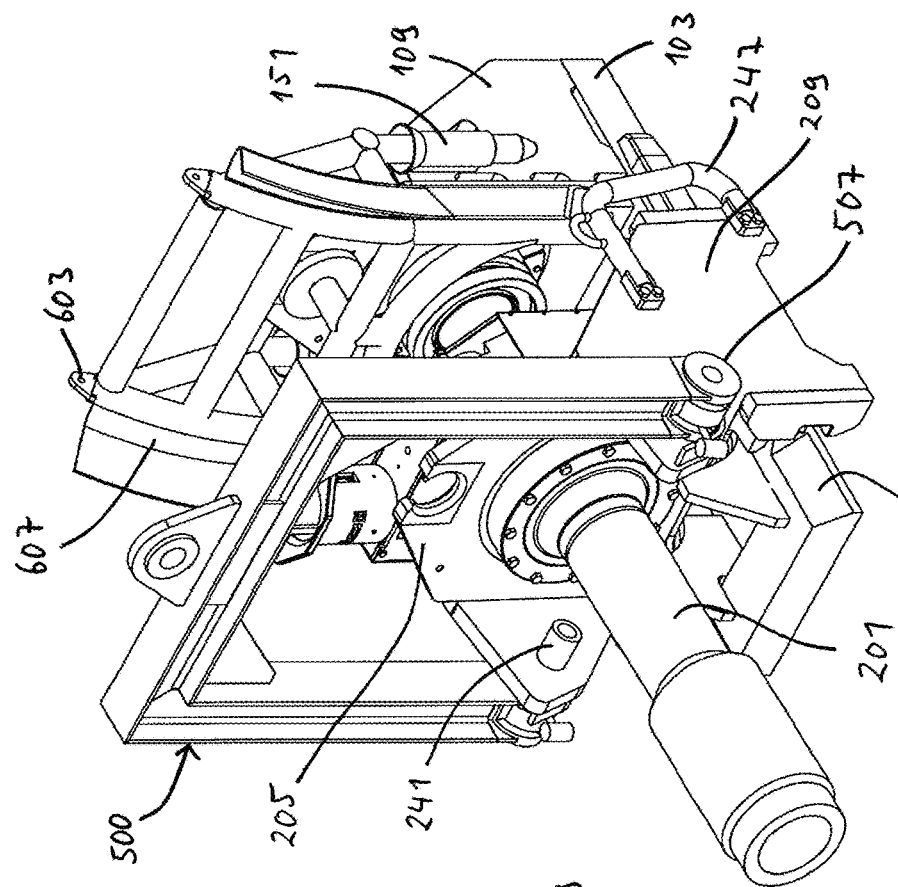
FIG. 40 depicts the same as FIG. 38, however in a landed position.
Figure 39:
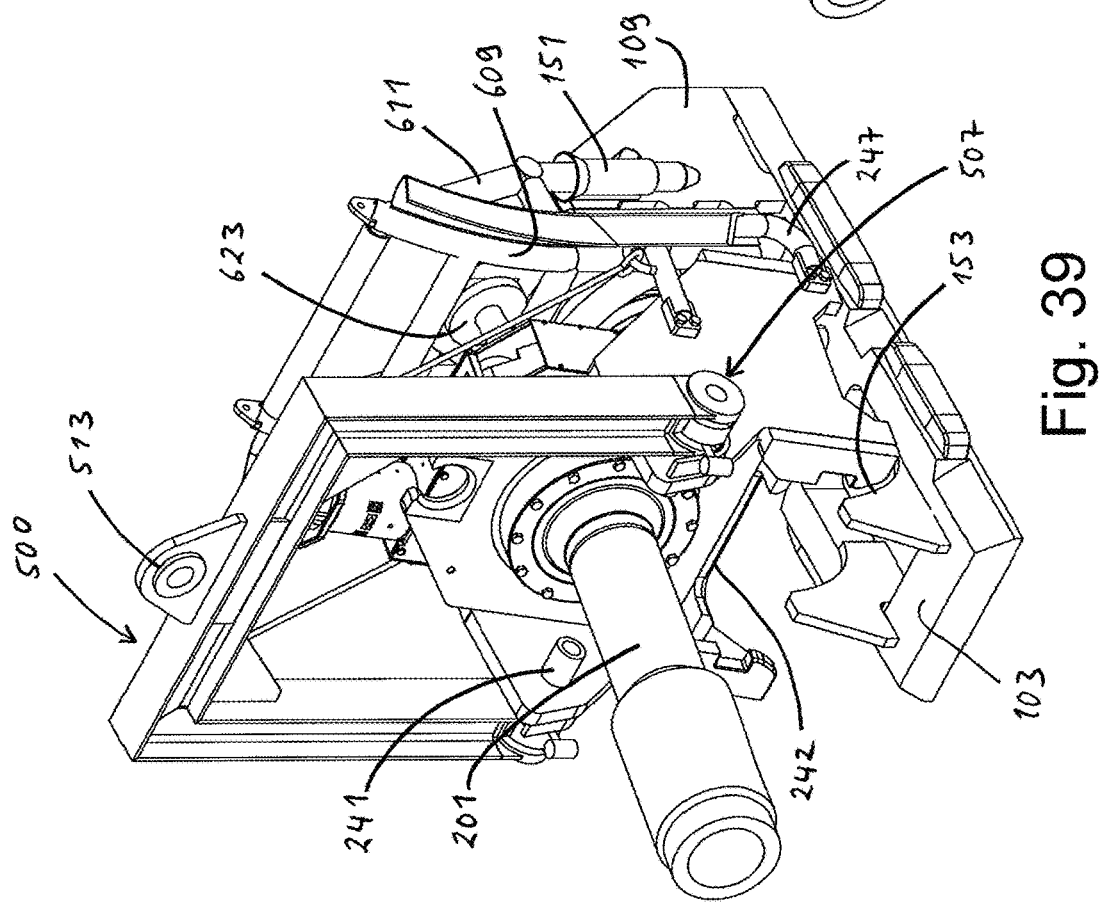
FIG. 39 depicts the same as FIG. 38, however in a situation closer to final landing of the termination part.

In FIG. 37, the guide frame 600 is shown in the landed position on the porch part 100.

Figure 44:
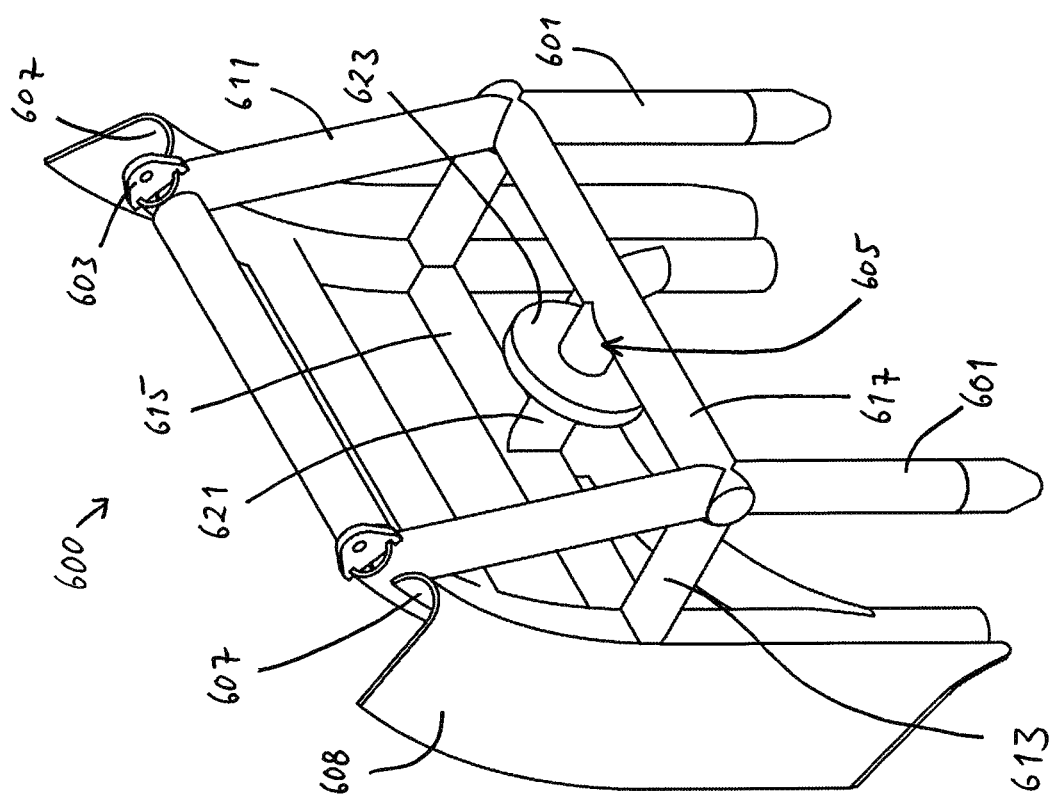
FIG. 44 is another perspective view of the guide frame.
Figure 43:
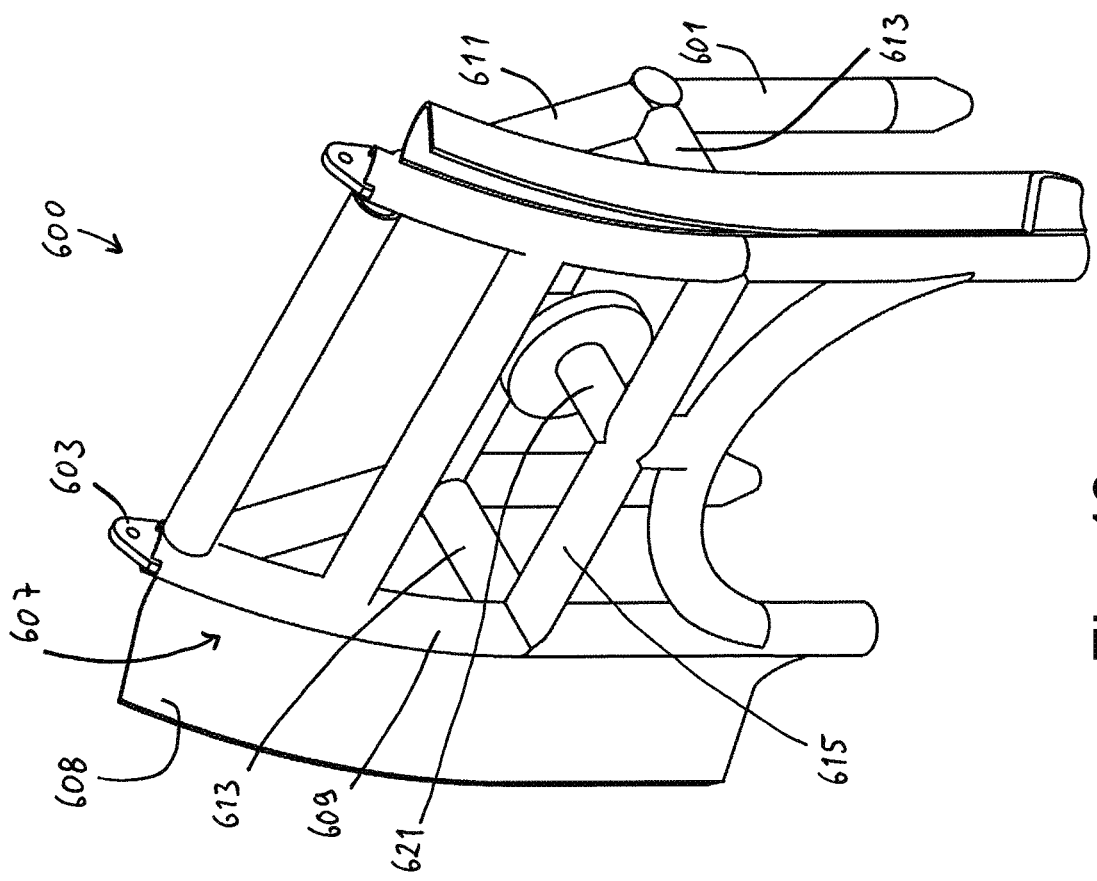
FIG. 43 is a perspective view of the guide frame.

During discussion of the guide frame 600, reference is also made to FIG. 43 and FIG. 44, depicting the guide frame 600 with separate perspective views.

The guide frame 600 comprises two guide frame guides 607, which in the discussed embodiment have the shape of guide tracks. Moreover, in the discussed embodiment, the guide tracks 607 have a substantially vertically extension, at least along a substantial part of their length.

The guide frame 600 comprises two front bars 609 that are substantially vertical at their lower portion, and which exhibit a curved upper portion. In the shown embodiment, the lifting eyes 603 are arranged at the top end of respective front bars 609.

The guide frame 600 further comprises two rear bars 611. In the shown embodiment, the two rear bars 611 extend downwards from the position of the lifting eyes 603 towards the guide frame pins 601. Extending substantially horizontally between a mid-portion of the front bars 609 and the rear bars 611 are two side bars 613.

Moreover, between each front bar 609 there is a substantially horizontally extending front cross bar 615, at a vertical distance from the upper and lower ends of the front bars 609. Between each rear bar 611, there is a rear cross bar 617.

Between a mid-portion of the front cross bar 615 and a mid-portion of the rear cross bar 617, there is a landing bar 621. The landing bar 621 is configured to land in the stroke tool interface 117 of the porch part 100, when the guide frame 600 is landed on the porch part 100. An engagement disk 623 is attached to the landing bar 621 and is configured to be positioned on one side of the connection plate 105 that carries the stroke tool interface 117. The rear cross bar 617 will land on the opposite side. The engagement disk 623 is thus a part of the guide frame landing support 605 in this embodiment.

It will be appreciated that the guide frame 600 may be constructed by other components than the bars shown in the discussed embodiment. Moreover, the guide frame landing support 605 may have another configuration than the shown landing bar 621 with engagement disk 623.

The guide frame guides, which in the shown embodiment are in the form of guide tracks 607, are configured to guide the termination part 200 when the termination part 200 is landed on the porch part 100. In the embodiment shown herein, this portion of the termination part 200 is the bumper bars 247, which are well shown in FIG. 31 and FIG. 32.

The guide tracks 607 each comprises a curved metal plate 608 that is attached to the respective front bars 609.

Figure 38:
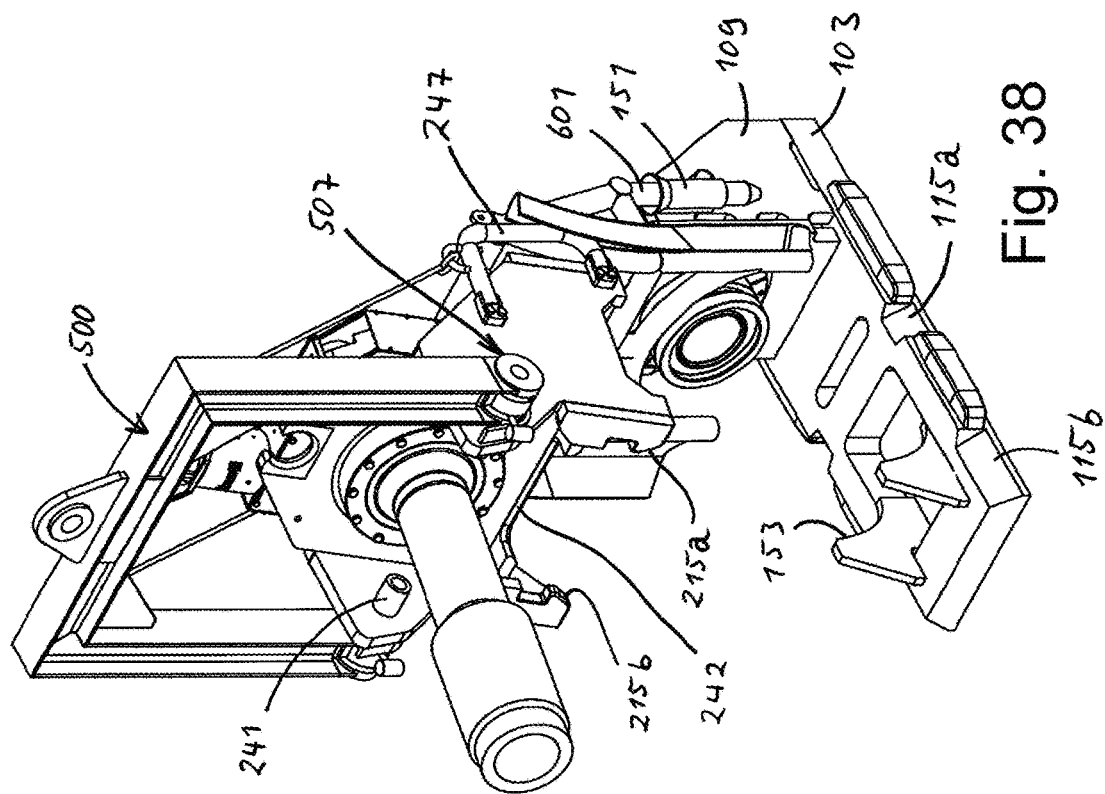
FIG. 38 is a perspective view of a termination part that is about to be landed on the porch part, and wherein the guide frame contributes in guiding the termination part.

FIG. 38 depicts landing of the termination part 200. The bumper bars 247 are received in the guide tracks 607. In this way, when landing, the position of the termination part 200 is such that the termination landing guide faces 215a, 215b engage with the porch landing guide faces 115a, 115b. The landing of the termination part 200 onto the porch part 100 is further shown in FIG. 39 and FIG. 40.

The guide frame 600 will ensure that the termination hub 201a does not collide with the porch hub 101a during landing of the termination part 200.

Figure 41:
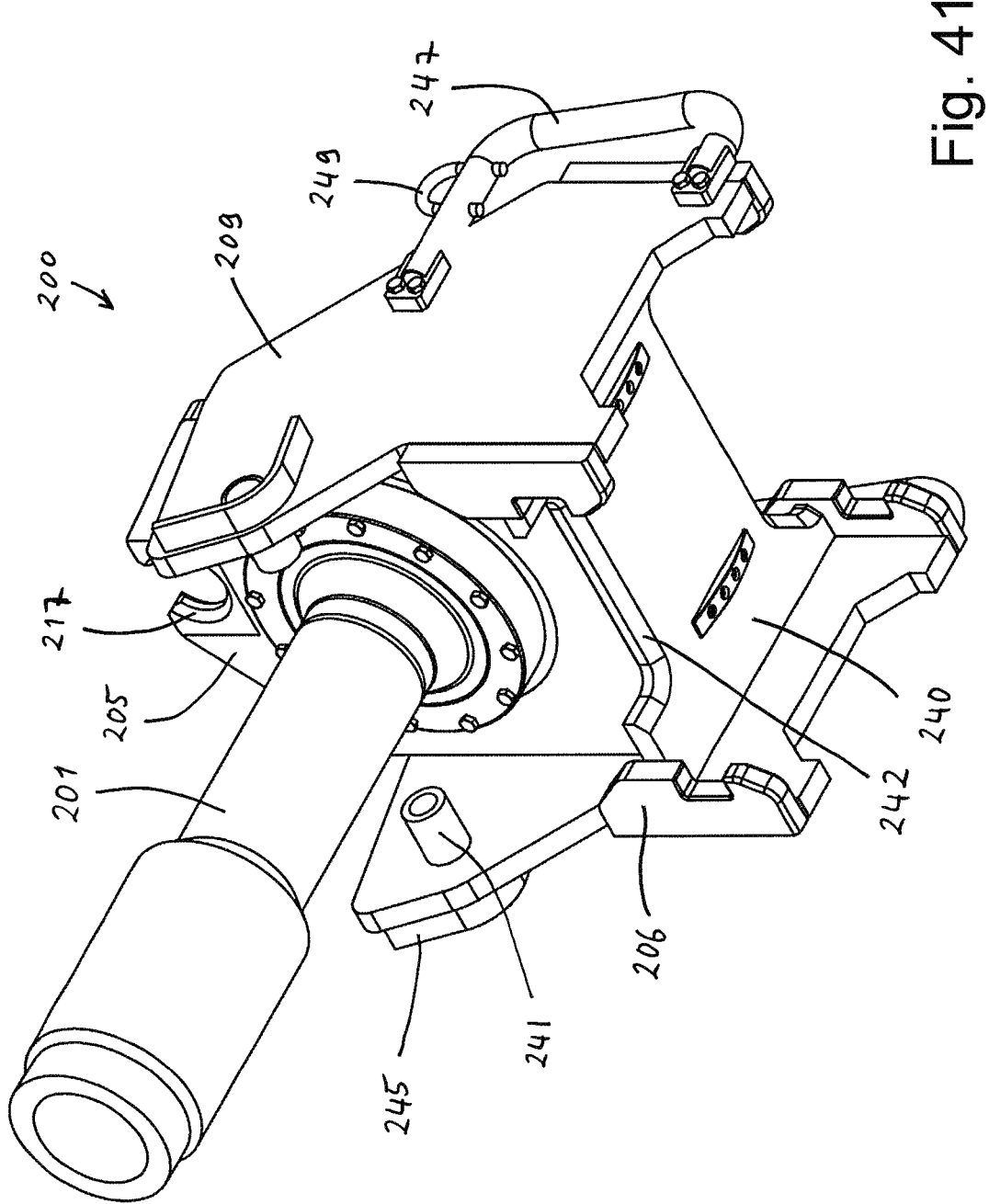
FIG. 41 depicts the termination part shown in FIG. 31, however seen from below.

FIG. 41 depicts the termination part 200 with a perspective view partly from below. Between the two aft plates 209 and in a position below the termination hub 201a (not visible in FIG. 41), there is arranged a lower termination plate 240. The lower termination plate 240 comprises a termination landing edge 242, which will engage the porch guide profiles 153 on the porch part 100 when the termination part 200 lands. The porch guide profiles 153 are inclined with respect to the vertical and horizontal directions. In the shown embodiment, the porch guide profiles 153 have a curved design. In other embodiments, the porch guide profiles 153 may have a straight, but inclined shape.

If the tie-in spool 201, or typically the end of a flexible jumper or flowline, should pull the termination part 200 in a backwards direction, the inclination of the porch guide profiles 153 will provide a lift of the termination part 200. In this manner, the termination part 200 would be moved back upward along the substantially same path it had during landing. Furthermore, the engagement between the porch guide profiles 153 and the termination part will prevent the termination part from moving excessively backwards along a horizontal path.

Furthermore, as perhaps best appreciated from the side view of FIG. 42, when the termination part 200 has landed on the porch part 100, the engagement between the termination part 200 and the porch guide profiles 153 will have moved the termination part 200 a bit forward. This forward movement will provide that the forward guide slots 213a of the termination part 200 enters into engagement with the forward porch guiding members 113a. This engagement will retain the front portion of the termination part 200 from being tilted upwards as a result of a downwardly directed force on the rear portion of the termination part 200. Such a downwardly directed force could typically result from the tie-in spool 201, or more probably in this embodiment, a flexible jumper or flowline.

When the termination part 200 has landed on the porch part 100, the guide frame 600 can be retrieved.

In the embodiment of the termination part 200, as shown in FIG. 31 and FIG. 32, in addition to the two auxiliary plates 206, which correspond to the auxiliary plates 206 shown in the embodiment depicted in FIG. 1, the termination part 200 shown in FIGS. 31 and 32 has two additional auxiliary plates 206. In the embodiment shown in FIG. 31 and FIG. 32, all the termination landing guide faces 215a, 215b are arranged on these auxiliary plates 206.

The guide frame 600 is shown in separate views in FIG. 43 and FIG. 44. As appears best from FIG. 44, the guide frame landing support 605 is in this embodiment formed by a rear portion of the landing bar 621 and the engagement disk 623.

A method of providing a porch part 100 of a subsea horizontal tie-in system. The porch part 100 comprises a vertically arranged connection plate 105 to which a porch hub 101a is attached, a base plate 103 to which the connection plate 105 is attached, and porch guide faces 113p, 113q, 113r that are configured to slide against termination guide faces of a termination part 200. The method comprises the following steps: a) cutting the base plate 103 out of a single metal plate; b) attaching the connection plate 105 to the base plate 103 in a permanent manner; c) after step b), machining the porch guide faces 113p, 113q, 113r while they are attached to or being part of the base plate 103, or machining attachment faces on the base plate 103, onto which guiding members 113a, 113b comprising the porch guide faces 113p, 113q, 113r are configured to be attached.

The method may comprise a step c) that comprises one of the following: machining the porch guide faces 113p, 113q, 113r directly in the material of the base plate; machining attachment faces directly in the material of the base plate, then attaching guiding members 113a, 113b to the attachment faces; or machining attachment faces directly in the material of the base plate, then attaching guiding members 113a, 113b to the attaching faces, and then machining the guide faces 113p, 113q, 113r of the guiding members. Step c) may also comprise machining a porch hub attachment interface in the connection plate 105.

A subsea horizontal tie-in system comprises a porch part 100 with a porch hub 101a; a termination part 200 with a termination hub 201a, the termination part being configured to land on the porch part; an alignment system configured to align the porch hub 101a and the termination hub 201a during movement of the termination hub towards the porch hub in a landed state, wherein the alignment system comprises guide arrangements A1, A2, B1, B2 having porch guide faces 113p, 113q, 113r on the porch part and termination guide faces 213p, 213q, 213r on the termination part, wherein the porch guide faces and termination guide faces are configured to slide against each other during said movement; the porch part 100 comprises a base plate 103 on which the porch guide faces are arranged.

The subsea horizontal tie-in system may also comprise a guide frame 600 configured to land on the porch part 100, wherein the guide frame comprises a guide frame landing alignment means 601 and a guide frame guide 607, wherein the guide frame guide 607 is configured to guide the termination part 200 during landing of the termination part onto the porch part 100. In the subsea horizontal tie-in system, the guide frame 600 may be installable on the porch part 100 and retrievable from the porch part when the porch part is in an installed, subsea position, and when the termination part 200 is in a non-installed position on the porch part and in a landed position on the porch part.

The subsea horizontal tie-in system may comprise a porch part 100 that comprises a porch guide profile 153 extending with an inclination with respect to the vertical and horizontal direction, wherein the porch guide profile 153 is configured to engage the termination part 200 during landing of the termination part, such that the termination part is moved forward towards the porch hub 101a due to the engagement between the termination part and the porch guide profile.

The subsea horizontal tie-in system may be such that engagement between the termination part 200 and the porch guide profile 153 is configured to move the forward guide slots 213a of the termination part into engagement with the forward porch guiding members 113a. The subsea horizontal tie-in system may be such that the porch guide profile 153 and the guide frame guide 607 are configured to guide the termination landing guide faces 215a, 215b towards engagement with the porch landing guide faces 115a, 115b.

A subsea horizontal tie-in system comprises a porch part 100 with a porch hub 101a; a termination part 200 with a termination hub 201a, the termination part being configured to land on the porch part; an alignment system configured to align the porch hub 101a and the termination hub 201a during movement of the termination hub towards the porch hub in a landed state; a guide frame 600 comprising a guide frame landing alignment means 601 and a guide frame guide 607, wherein the guide frame guide 607 is configured to guide the termination part 200 during landing of the termination part onto the porch part 100; wherein the guide frame 600 is installable onto the porch part before landing of the termination part and before retrieval of the termination part, and wherein the guide frame 600 is retrievable from the porch part after landing of the termination part.

A guide frame 600 configured to be installed on and retrieved from a porch part 100 of a subsea horizontal tie-in system, the guide frame comprises two guide frame pins 601 configured to enter into engagement with the porch part 100 and a guide frame landing support 605 configured to arrest the position of the guide frame 600 on the porch part 100, the guide frame further comprises a guide frame guide 607 configured to guide a termination part 200 of said subsea horizontal tie-in system during landing.

The guide frame 600 may be such that the guide frame landing support 605 is configured to engage a stroke tool interface 117 of the porch part when in the landed, installed position on the porch part 100.

The invention claimed is:

1. A subsea horizontal tie-in system comprising:
a porch part with a porch hub;
a termination part with a termination hub, the termination part being configured to land on the porch part;
an alignment system configured to align the porch hub and the termination hub during movement of the termination hub towards the porch hub in a landed state, wherein the alignment system comprises guide arrangements having porch guide faces on the porch part and termination guide faces on the termination part, wherein the porch guide faces and termination guide faces are configured to slide against each other during the movement; and
wherein the porch part comprises a base plate on which the porch guide faces are arranged.

2. The subsea horizontal tie-in system according to claim 1, wherein the porch part further comprises a connection plate attached to and extending vertically up from the base plate, wherein the connection plate connects to the porch hub and faces in a direction parallel to the axial center axis of the porch hub, and wherein the base plate is manufactured from a single metal plate.

3. The subsea horizontal tie-in system according to claim 1, wherein the alignment system comprises two forward guide arrangements and two aft guide arrangements at an axial distance from the two forward guide arrangements, wherein the forward and aft guide arrangements comprise the porch guide faces and termination guide faces.

4. The subsea horizontal tie-in system according to claim 3, wherein:
when in a connected position, the two forward guide arrangements are arranged at a forward axial position, on respective lateral sides and below the axial center axis;
the two aft guide arrangements are arranged at an aft axial position, on respective lateral sides and below the axial center axis;
there is an axial distance between the forward axial position and the aft axial position;
a central hub position is arranged axially between the forward and aft axial positions and laterally between the two pairs of guide arrangements on respective lateral sides of the axial center axis; and
wherein the central hub position is arranged on the axial center axis of the porch hub and the termination hub, and at an axial position where the porch hub and the termination hub are configured to abut each other.

5. The subsea horizontal tie-in system according to claim 4, wherein the central hub position is arranged centrally between the forward axial position and the aft axial position, and that the central hub position is arranged centrally between the respective two pairs of guide arrangements on respective lateral sides of the axial center axis.

6. The subsea horizontal tie-in system according to claim 1, wherein the guide arrangements comprise guiding members and guide slots, wherein the guiding members are configured to extend into and slide against the guide slots, and wherein the guiding members comprise:
a lateral guiding face that is substantially vertical;

an upper guiding face that is parallel to a substantially horizontal line orthogonal to the axial center axis of the porch hub;

a lower guiding face that is parallel to a substantially horizontal line orthogonal to the axial center axis of the porch hub; and wherein the upper and lower guiding faces are substantially orthogonally oriented with respect to the lateral guiding face.

7. The subsea horizontal tie-in system according to claim 6, wherein the guide slots comprise:

a lateral guiding face that is substantially vertical;

an upper guiding face that is parallel to a substantially horizontal line orthogonal to the axial center axis of the termination hub;

a lower guiding face that is parallel to a substantially horizontal line orthogonal to the axial center axis of the termination hub; and wherein the upper and lower guiding faces are substantially orthogonally oriented with respect to the lateral guiding face.

8. The subsea horizontal tie-in system according to claim 6, wherein the lateral guiding face, the upper guiding face, and/or the lower guiding face, respectively, of the guiding members comprises an inclined front guiding face and an axial guiding face, wherein the inclined front guiding face is inclined with respect to the porch hub center axis, while the axial guiding face is parallel to the porch hub center axis.

9. The subsea horizontal tie-in system according to claim 8, wherein the inclined front guiding face comprises a front portion and a rear portion, and that the distance between the respective front portions of an inclined front guiding face of a forward guiding member and an aft guiding member on the same side of the base plate, respectively, is less than the distance between respective front portions of a forward guide slot and an aft guide slot.

10. The subsea horizontal tie-in system according to claim 1, wherein the base plate comprises porch landing guide faces and that the termination part comprises termination landing guide faces, wherein the porch landing guide faces and termination landing guide faces are configured to slide against each other when the termination part is landed on the porch part.

11. The subsea horizontal tie-in system according to claim 10, wherein two forward porch landing guide faces are arranged between the porch guide faces of a forward guiding arrangement and an aft guiding arrangement, one on respective side of the base plate.

12. The subsea tie-in system according to claim 10, wherein an aft guiding member of an aft guiding arrangement is arranged on the base plate between a forward porch landing guide face and an aft porch landing guide face.

13. The subsea horizontal tie-in system according to claim 1, wherein the termination part comprises a main plate surrounding and facing in a direction parallel to the axial center axis of the termination hub, wherein the main plate comprises:

aft termination landing guide faces configured to slide on aft porch landing guide faces; and aft guide slots configured to receive aft guiding members of the porch part.

14. The subsea horizontal tie-in system according to claim 13, wherein the termination part further comprises two vertically extending and parallel to the center axis of the spool termination hub extending aft plates, of which one is arranged on respective lateral side of the center axis, wherein the aft plates connect the main plate to:

forward termination landing guide faces configured to slide on forward porch landing guide faces; and forward guide slots configured to receive forward guiding members of the porch part.

15. The subsea horizontal tie-in system according to claim 1, wherein the termination part further comprises:

a first alignment means arranged at a first axial side of the termination hub;

a second alignment means arranged at a second, opposite side of the termination hub; and wherein the first and second alignment means are connected to each other in a fixed manner and are further connected to the rest of the termination part with an axially sliding connection.

16. The subsea horizontal tie-in system according to claim 15, wherein the first and second alignment means are connected to each other via a sliding cylinder, which is supported in a support sleeve.

17. The subsea horizontal tie-in system according to claim 1, wherein:

the termination part is configured to be connected to or comprises a pig launcher/pig receiver;

the porch part comprises a moment absorbing guide means, which is configured to absorb bending moment resulting from the weight of the pig launcher/pig receiver;

the termination part comprises a guide means engagement arrangement, which is configured to engage the moment absorbing guide means and to transfer a bending moment to the moment absorbing guide means; and wherein the guide means engagement arrangement is configured to slide in an axial direction with respect to the pig launcher/pig receiver, as an axial sliding arrangement connects the guide means arrangement to the pig launcher/pig receiver with an axially sliding connection.

18. The subsea horizontal tie-in system according to claim 17, wherein the axial sliding arrangement comprises two guide plates with parallel upper and lower, axially extending edges, which are arranged within axially extending guide slots.

19. The subsea horizontal tie-in system according to claim 17, wherein the moment absorbing guide means comprises a vertically extending stab receptacle with a vertically extending slit, through which a mechanical connection between the axial sliding arrangement and the guide means engagement arrangement extends.

20. A method of providing a porch part of a subsea horizontal tie-in system, wherein the porch part comprises a vertically arranged connection plate to which a porch hub is attached, a base plate to which the connection plate is attached, and porch guide faces that are configured to slide against termination guide faces of a termination part, the method comprising:

a) cutting the base plate out of a single metal plate;

b) attaching the connection plate to the base plate in a permanent manner;

c) after step b), machining the porch guide faces while they are attached to or being part of the base plate, or machining attachment faces on the base plate, onto which guiding members comprising the porch guide faces are configured to be attached.

* * * * *